(12) United States Patent
LaPadula, III et al.

(10) Patent No.: US 9,082,074 B2
(45) Date of Patent: Jul. 14, 2015

(54) COMPUTERIZED SYSTEM AND METHOD FOR CALIBRATING SPORTS STATISTICS PROJECTIONS BY PLAYER PERFORMANCE TIERS

(71) Applicant: Advanced Sports Logic, Inc., Rochester, NH (US)

(72) Inventors: Leonard John LaPadula, III, Rochester, NH (US); Jon Abraham, Sudbury, MA (US)

(73) Assignee: Advanced Sports Logic, Inc., Rochester, NH (US)

(*) Notice: Subject to any disclaimer, the term of this patent is extended or adjusted under 35 U.S.C. 154(b) by 297 days.

(21) Appl. No.: 13/986,241

(22) Filed: Apr. 15, 2013

(65) Prior Publication Data

US 2013/0282640 A1 Oct. 24, 2013

Related U.S. Application Data

(60) Provisional application No. 61/687,100, filed on Apr. 18, 2012.

(51) Int. Cl.
  *G06N 5/02* (2006.01)
  *A63F 13/828* (2014.01)
  *G06Q 10/00* (2012.01)

(52) U.S. Cl.
  CPC ............. *G06N 5/02* (2013.01); *A63F 13/828* (2014.09); *G06N 5/022* (2013.01); *G06Q 10/00* (2013.01); *A63F 2300/69* (2013.01)

(58) Field of Classification Search
  None
  See application file for complete search history.

(56) References Cited

U.S. PATENT DOCUMENTS

| | | | |
|---|---|---|---|
| 2006/0258421 A1* | 11/2006 | Nicholas et al. | 463/4 |
| 2008/0125228 A1* | 5/2008 | Ware et al. | 463/42 |
| 2008/0281444 A1* | 11/2008 | Krieger et al. | 700/91 |
| 2012/0329542 A1* | 12/2012 | Sloan et al. | 463/9 |
| 2013/0166693 A1* | 6/2013 | Fernandez et al. | 709/219 |

\* cited by examiner

*Primary Examiner* — David Vincent
*Assistant Examiner* — Benjamin Buss
(74) *Attorney, Agent, or Firm* — Paul C. Remus; Devine, Millimet & Branch, P.A.

(57) ABSTRACT

The system and method provides team guidance recommendations. The system and method provides player selection guidance by realistically valuing top-tier and lower-tier players. The system and method provides situational-based starting lineup recommendations by creating and using tier-specific, non-normal distributions in a probability distribution-based system for providing fantasy sports player selection guidance. The system and method generates variance and accuracy information from historical data of a particular player projection system, and generates non-normal fantasy point distributions from the same player projection system using the previously generated variance and accuracy information.

18 Claims, 24 Drawing Sheets

| A | B | C | D | E | F | G | H | I | J | K | L | M |
|---|---|---|---|---|---|---|---|---|---|---|---|---|
| FW -12 | | | | | | | | | | | | |
| TW 1 | | | | | | | | | | | | |
| Pos | Tier | TierName | -1 | -0.93548 | -0.80645 | -0.67742 | -0.54839 | -0.41935 | -0.29032 | -0.16129 | -0.03226 | 0.096774 |
| DB | 1 | Top 10 | 0.10625 | 0 | 0 | 0 | 0.0125 | 0.04375 | 0.04375 | 0.29375 | 0.25625 | 0.1875 |
| DB | 2 | 11th - 30tt | 0.015625 | 0 | 0 | 0 | 0.003125 | 0 | 0.075 | 0.25 | 0.2375 | 0.253125 |
| DB | 3 | 31st - 100t | 0.050893 | 0 | 0 | 0 | 0 | 0.001786 | 0.022321 | 0.216071 | 0.255357 | 0.169643 |
| DB | 4 | >100th No | 0.123964 | 0 | 0.00583 | 0 | 0.002455 | 0.007364 | 0.041731 | 0.147898 | 0.224916 | 0.185026 |
| DB | 5 | Zero Rem | 0.895718 | 0 | 0.026243 | 0.015193 | 0.037293 | 0.006906 | 0.006906 | 0.000691 | 0 | 0 |
| DEF-ST | 1 | Top 10 | 0 | 0 | 0 | 0 | 0 | 0 | 0.1 | 0.2375 | 0.40625 | 0.16875 |
| DEF-ST | 2 | 11th - 20tt | 0 | 0 | 0 | 0 | 0 | 0.01875 | 0.04375 | 0.2 | 0.28125 | 0.29375 |
| DEF-ST | 3 | 21st - 32th | 0 | 0 | 0 | 0 | 0 | 0.010417 | 0.057292 | 0.072917 | 0.239583 | 0.208333 |
| DL | 1 | Top 10 | 0 | 0 | 0 | 0 | 0 | 0 | 0.01875 | 0.175 | 0.29375 | 0.28125 |
| DL | 2 | 11th - 30tt | 0.01875 | 0 | 0 | 0 | 0 | 0.003125 | 0.0125 | 0.275 | 0.34375 | 0.2625 |
| DL | 3 | 31st - 100t | 0.066964 | 0 | 0 | 0 | 0 | 0.005357 | 0.039286 | 0.195536 | 0.216964 | 0.257143 |
| DL | 4 | >100th No | 0.131549 | 0 | 0 | 0 | 0 | 0.002677 | 0.026386 | 0.105163 | 0.256979 | 0.171319 |
| DL | 5 | Zero Rem | 0.904707 | 0 | 0.034443 | 0.008037 | 0.049369 | 0.003444 | 0 | 0 | 0 | 0 |
| K | 1 | Top 10 | 0.0375 | 0 | 0 | 0 | 0 | 0 | 0.03125 | 0.15 | 0.64375 | 0.13125 |
| K | 2 | 11th - 30tt | 0.184375 | 0 | 0 | 0 | 0 | 0 | 0.009375 | 0.0625 | 0.425 | 0.240625 |
| K | 3 | 31st - 100t | 0.2 | 0 | 0 | 0 | 0 | 0 | 0 | 0 | 0 | 0.0125 |
| LB | 1 | Top 10 | 0.0125 | 0 | 0 | 0 | 0 | 0.0625 | 0.05 | 0.40625 | 0.38125 | 0.08125 |
| LB | 2 | 11th - 30tt | 0.00625 | 0 | 0 | 0 | 0 | 0.015625 | 0.084375 | 0.221875 | 0.284375 | 0.2875 |
| LB | 3 | 31st - 100t | 0.073214 | 0 | 0 | 0 | 0 | 0.0125 | 0.015179 | 0.153571 | 0.216964 | 0.253571 |
| LB | 4 | >100th No | 0.093617 | 0 | 0.004255 | 0.006383 | 0.003191 | 0.006383 | 0.033511 | 0.140426 | 0.229787 | 0.20266 |
| LB | 5 | Zero Rem | 0.873473 | 0 | 0.022688 | 0.02007 | 0.006108 | 0.013089 | 0.057592 | 0.006108 | 0.000873 | 0 |
| P | 1 | Top 10 | 0.1 | 0 | 0 | 0 | 0 | 0 | 0 | 0.09375 | 0.475 | 0.23125 |
| P | 2 | 11th - 30tt | 0.115625 | 0 | 0 | 0 | 0 | 0.046875 | 0.059375 | 0.09375 | 0.334375 | 0.275 |
| P | 3 | 31st - 100t | 0.03125 | 0 | 0 | 0 | 0 | 0 | 0 | 0 | 0 | 0.03125 |
| QB | 1 | Top 10 | 0.0125 | 0 | 0 | 0.00625 | 0 | 0 | 0 | 0.0875 | 0.68125 | 0.2125 |
| QB | 2 | 11th - 30tt | 0.105263 | 0 | 0 | 0 | 0 | 0 | 0.006579 | 0.184211 | 0.378289 | 0.210526 |
| QB | 3 | 31st - 100t | 0.213256 | 0.005764 | 0.005764 | 0.002882 | 0.095101 | 0 | 0.008646 | 0.020173 | 0.414986 | 0.014409 |
| RB | 1 | Top 10 | 0 | 0 | 0 | 0 | 0 | 0.00625 | 0.03125 | 0.18125 | 0.325 | 0.35625 |
| RB | 2 | 11th - 30tt | 0 | 0 | 0 | 0 | 0 | 0 | 0.025 | 0.165625 | 0.353125 | 0.31875 |
| RB | 3 | 31st - 100t | 0.119643 | 0 | 0.03125 | 0.054464 | 0.049107 | 0.03125 | 0.041964 | 0.113393 | 0.171429 | 0.1125 |
| RB | 4 | >100th No | 0.299669 | 0 | 0.011589 | 0.003311 | 0.011589 | 0.014901 | 0.05298 | 0.057947 | 0.155629 | 0.013245 |

Figure 5A

| N | O | P | Q | R | S | T |
|---|---|---|---|---|---|---|
|  |  |  |  |  |  |  |
|  |  |  |  |  |  |  |
| 0.225806 | 0.354839 | 0.483871 | 0.612903 | 0.741935 | 0.870968 | 1 |
| 0.05625 | 0 | 0 | 0 | 0 | 0 | 0 |
| 0.09375 | 0.065625 | 0.00625 | 0 | 0 | 0 | 0 |
| 0.15625 | 0.079464 | 0.027679 | 0.008929 | 0.00625 | 0.002679 | 0.002679 |
| 0.11568 | 0.060141 | 0.019945 | 0.008285 | 0.006444 | 0.000614 | 0.049709 |
| 0 | 0.000691 | 0.002762 | 0.005525 | 0.001381 | 0.000691 | 0 |
| 0.08125 | 0.00625 | 0 | 0 | 0 | 0 | 0 |
| 0.06875 | 0.075 | 0.0125 | 0 | 0.00625 | 0 | 0 |
| 0.135417 | 0.125 | 0.020833 | 0.067708 | 0.026042 | 0.015625 | 0.020833 |
| 0.19375 | 0.0375 | 0 | 0 | 0 | 0 | 0 |
| 0.0625 | 0.015625 | 0.00625 | 0 | 0 | 0 | 0 |
| 0.110714 | 0.075 | 0.026786 | 0.002679 | 0.002679 | 0 | 0.000893 |
| 0.141491 | 0.057744 | 0.017591 | 0.011472 | 0.004207 | 0.002294 | 0.071128 |
| 0 | 0 | 0 | 0 | 0 | 0 | 0 |
| 0.00625 | 0 | 0 | 0 | 0 | 0 | 0 |
| 0.06875 | 0.009375 | 0 | 0 | 0 | 0 | 0 |
| 0 | 0 | 0.025 | 0.0625 | 0.15 | 0.25 | 0.3 |
| 0.00625 | 0 | 0 | 0 | 0 | 0 | 0 |
| 0.09375 | 0.003125 | 0.003125 | 0 | 0 | 0 | 0 |
| 0.185714 | 0.071429 | 0.016964 | 0.000893 | 0 | 0 | 0 |
| 0.123936 | 0.067553 | 0.030319 | 0.010106 | 0.004787 | 0.001596 | 0.041489 |
| 0 | 0 | 0 | 0 | 0 | 0 | 0 |
| 0 | 0 | 0 | 0 | 0.00625 | 0 | 0.09375 |
| 0.028125 | 0 | 0 | 0.015625 | 0.009375 | 0.00625 | 0.015625 |
| 0.09375 | 0.25 | 0.40625 | 0.15625 | 0.03125 | 0 | 0 |
| 0 | 0 | 0 | 0 | 0 | 0 | 0 |
| 0.042763 | 0.036184 | 0.016447 | 0.009868 | 0.009868 | 0 | 0 |
| 0.020173 | 0.011527 | 0.020173 | 0.014409 | 0.011527 | 0.008646 | 0.132565 |
| 0.09375 | 0.00625 | 0 | 0 | 0 | 0 | 0 |
| 0.071875 | 0.021875 | 0.034375 | 0.00625 | 0.003125 | 0 | 0 |
| 0.063393 | 0.041964 | 0.022321 | 0.016964 | 0.016071 | 0.019643 | 0.094643 |
| 0.031457 | 0.033113 | 0.038079 | 0.016556 | 0.014901 | 0.004967 | 0.240066 |

Figure 5B

| A | B | C | D | E | F | G | H | I | J | K | L | M |
|---|---|---|---|---|---|---|---|---|---|---|---|---|
| RB | 5 | Zero Rem | 0.914361 | 0.01581 | 0.040843 | 0.018445 | 0.00527 | 0 | 0 | 0 | 0.002635 | 0 |
| TE | 1 | Top 10 | 0 | 0 | 0 | 0 | 0 | 0.03125 | 0.125 | 0.26875 | 0.2875 | 0.25625 |
| TE | 2 | 11th - 30th | 0.170347 | 0 | 0.041009 | 0 | 0.025237 | 0.050473 | 0.037855 | 0.132492 | 0.277603 | 0.154574 |
| TE | 3 | 31st - 100t | 0.292848 | 0 | 0.055331 | 0.024291 | 0.018893 | 0.025641 | 0.031039 | 0.020243 | 0.103914 | 0.068826 |
| TE | 5 | Zero Rem | 1 | 0 | 0 | 0 | 0 | 0 | 0 | 0 | 0 | 0 |
| TMDB | 1 | Top 10 | 0 | 0 | 0 | 0 | 0 | 0 | 0.075 | 0.30625 | 0.54375 | 0.075 |
| TMDB | 2 | 11th - 20th | 0 | 0 | 0 | 0 | 0 | 0 | 0 | 0.14375 | 0.425 | 0.40625 |
| TMDB | 3 | 21st - 32th | 0 | 0 | 0 | 0 | 0 | 0 | 0 | 0.130208 | 0.229167 | 0.421875 |
| TMDL | 1 | Top 10 | 0 | 0 | 0 | 0 | 0 | 0 | 0.0375 | 0.34375 | 0.33125 | 0.1875 |
| TMDL | 2 | 11th - 20th | 0 | 0 | 0 | 0 | 0 | 0 | 0.0125 | 0.1125 | 0.4625 | 0.2875 |
| TMDL | 3 | 21st - 32th | 0 | 0 | 0 | 0 | 0 | 0.020833 | 0.161458 | 0.203125 | 0.3125 | 0.119792 |
| TMK | 1 | Top 10 | 0 | 0 | 0 | 0 | 0 | 0 | 0.0125 | 0.1875 | 0.6875 | 0.10625 |
| TMK | 2 | 11th - 20th | 0 | 0 | 0 | 0 | 0 | 0 | 0 | 0.075 | 0.625 | 0.26875 |
| TMK | 3 | 21st - 32th | 0 | 0 | 0 | 0 | 0 | 0 | 0.005208 | 0.145833 | 0.458333 | 0.286458 |
| TMLB | 1 | Top 10 | 0 | 0 | 0 | 0 | 0 | 0 | 0.00625 | 0.1875 | 0.575 | 0.225 |
| TMLB | 2 | 11th - 20th | 0 | 0 | 0 | 0 | 0 | 0.0125 | 0.1875 | 0.025 | 0.4125 | 0.275 |
| TMLB | 3 | 21st - 32th | 0 | 0 | 0 | 0 | 0 | 0 | 0 | 0.15625 | 0.197917 | 0.255208 |
| TMP | 1 | Top 10 | 0 | 0 | 0 | 0.0125 | 0.05625 | 0.03125 | 0 | 0.09375 | 0.475 | 0.23125 |
| TMP | 2 | 11th - 20th | 0 | 0 | 0 | 0 | 0 | 0.04375 | 0.3125 | 0.075 | 0.38125 | 0.1875 |
| TMP | 3 | 21st - 32th | 0 | 0 | 0 | 0 | 0 | 0.03125 | 0.104167 | 0.057292 | 0.255208 | 0.208333 |
| TMQB | 1 | Top 10 | 0 | 0 | 0 | 0 | 0 | 0 | 0.00625 | 0.00625 | 0.0625 | 0.7125 | 0.2125 |
| TMQB | 2 | 11th - 20th | 0 | 0 | 0 | 0 | 0 | 0.00625 | 0.1375 | 0.28125 | 0.39375 | 0.1625 |
| TMQB | 3 | 21st - 32th | 0 | 0 | 0 | 0 | 0 | 0 | 0 | 0.125 | 0.442708 | 0.270833 |
| TMRB | 1 | Top 10 | 0 | 0 | 0 | 0 | 0 | 0.00625 | 0.09375 | 0.2125 | 0.48125 | 0.19375 |
| TMRB | 2 | 11th - 20th | 0 | 0 | 0 | 0 | 0 | 0 | 0.04375 | 0.20625 | 0.29375 | 0.25625 |
| TMRB | 3 | 21st - 32th | 0 | 0 | 0 | 0 | 0 | 0.005208 | 0.020833 | 0.0625 | 0.270833 | 0.255208 |
| TMTE | 1 | Top 10 | 0 | 0 | 0 | 0 | 0.04375 | 0.09375 | 0.2125 | 0.25625 | 0.19375 | 0.175 |
| TMTE | 2 | 11th - 20th | 0 | 0 | 0 | 0.0875 | 0.1 | 0.09375 | 0.01875 | 0.1 | 0.1625 | 0.28125 |
| TMTE | 3 | 21st - 32th | 0 | 0 | 0 | 0.078125 | 0.005208 | 0 | 0.046875 | 0.088542 | 0.208333 | 0.21875 |
| TMWR | 1 | Top 10 | 0 | 0 | 0 | 0 | 0 | 0 | 0.05625 | 0.10625 | 0.55625 | 0.28125 |
| TMWR | 2 | 11th - 20th | 0 | 0 | 0 | 0 | 0 | 0 | 0 | 0.1125 | 0.55625 | 0.2625 |
| TMWR | 3 | 21st - 32th | 0 | 0 | 0 | 0 | 0 | 0 | 0.026042 | 0.229167 | 0.307292 | 0.203125 |
| WR | 1 | Top 10 | 0 | 0 | 0 | 0 | 0 | 0 | 0.01875 | 0.1625 | 0.35625 | 0.3875 |
| WR | 2 | 11th - 30th | 0 | 0 | 0.009464 | 0.018927 | 0.009464 | 0.009464 | 0 | 0.069401 | 0.463722 | 0.356467 |

Figure 5C

| N | O | P | Q | R | S | T |
|---|---|---|---|---|---|---|
| 0 | 0.001318 | 0 | 0 | 0 | 0 | 0.001318 |
| 0.03125 | 0 | 0 | 0 | 0 | 0 | 0 |
| 0.069401 | 0.025237 | 0.009464 | 0.003155 | 0.003155 | 0 | 0 |
| 0.037787 | 0.032389 | 0.014845 | 0.010796 | 0.010796 | 0.005398 | 0.246964 |
| 0 | 0 | 0 | 0 | 0 | 0 | 0 |
| 0 | 0 | 0 | 0 | 0 | 0 | 0 |
| 0.025 | 0 | 0 | 0 | 0 | 0 | 0 |
| 0.067708 | 0.145833 | 0.005208 | 0 | 0 | 0 | 0 |
| 0.025 | 0.0625 | 0.0125 | 0 | 0 | 0 | 0 |
| 0.03125 | 0.075 | 0.01875 | 0 | 0 | 0 | 0 |
| 0.041667 | 0.109375 | 0.03125 | 0 | 0 | 0 | 0 |
| 0.00625 | 0 | 0 | 0 | 0 | 0 | 0 |
| 0.03125 | 0 | 0 | 0 | 0 | 0 | 0 |
| 0.083333 | 0.020833 | 0 | 0 | 0 | 0 | 0 |
| 0.00625 | 0 | 0 | 0 | 0 | 0 | 0 |
| 0.0875 | 0 | 0 | 0 | 0 | 0 | 0 |
| 0.25 | 0.078125 | 0.03125 | 0.03125 | 0 | 0 | 0 |
| 0 | 0 | 0 | 0 | 0.00625 | 0 | 0.09375 |
| 0 | 0 | 0 | 0 | 0 | 0 | 0 |
| 0.010417 | 0.036458 | 0.098958 | 0.03125 | 0.03125 | 0.041667 | 0.09375 |
| 0 | 0 | 0 | 0 | 0 | 0 | 0 |
| 0.01875 | 0 | 0 | 0 | 0 | 0 | 0 |
| 0.135417 | 0.026042 | 0 | 0 | 0 | 0 | 0 |
| 0.0125 | 0 | 0 | 0 | 0 | 0 | 0 |
| 0.16875 | 0.01875 | 0.0125 | 0 | 0 | 0 | 0 |
| 0.203125 | 0.09375 | 0.057292 | 0.026042 | 0 | 0.005208 | 0 |
| 0.025 | 0 | 0 | 0 | 0 | 0 | 0 |
| 0.13125 | 0.025 | 0 | 0 | 0 | 0 | 0 |
| 0.072917 | 0.015625 | 0.026042 | 0.020833 | 0.015625 | 0.005208 | 0.197917 |
| 0 | 0 | 0 | 0 | 0 | 0 | 0 |
| 0.05 | 0.01875 | 0 | 0 | 0 | 0 | 0 |
| 0.15625 | 0.067708 | 0.010417 | 0 | 0 | 0 | 0 |
| 0.05625 | 0.0125 | 0.00625 | 0 | 0 | 0 | 0 |
| 0.063091 | 0 | 0 | 0 | 0 | 0 | 0 |

Figure 5D

| A | B | C | D | E | F | G | H | I | J | K | L | M |
|---|---|---|---|---|---|---|---|---|---|---|---|---|
| WR | | 3 | 31st - 100t | 0.04409 | 0 | 0.031895 | 0.047842 | 0.050657 | 0.049719 | 0.050657 | 0.143527 | 0.210131 | 0.199812 |
| WR | | 4 | >100th No | 0.283509 | 0 | 0.044679 | 0.021121 | 0.025995 | 0.021121 | 0.03818 | 0.032494 | 0.086921 | 0.034119 |
| WR | | 5 | Zero Rem | 0.822934 | 0.096121 | 0.008432 | 0.021922 | 0.016863 | 0.006745 | 0 | 0 | 0 | 0 |
| TW 2 | | | | | | | | | | | | | |
| Pos | Tier | | TierName | -1 | -0.93548 | -0.80645 | -0.67742 | -0.54839 | -0.41935 | -0.29032 | -0.16129 | -0.03226 | 0.096774 |
| DB | | 1 | Top 10 | 0.2 | 0 | 0 | 0 | 0.006667 | 0.046667 | 0.06 | 0.346667 | 0.173333 | 0.166667 |
| DB | | 2 | 11th - 30th | 0.013333 | 0 | 0 | 0 | 0.003333 | 0.003333 | 0.106667 | 0.163333 | 0.266667 | 0.28 |
| DB | | 3 | 31st - 100t | 0.06381 | 0 | 0 | 0.004762 | 0.009524 | 0 | 0.018095 | 0.139048 | 0.279048 | 0.23619 |
| DB | | 4 | >100th No | 0.159725 | 0 | 0.007215 | 0.012135 | 0.014759 | 0.019351 | 0.065267 | 0.128239 | 0.169892 | 0.13611 |
| DB | | 5 | Zero Rem | 0.807639 | 0.004167 | 0.034028 | 0.033333 | 0.059722 | 0.023611 | 0.021528 | 0.004861 | 0 | 0.000694 |
| DEF-ST | | 1 | Top 10 | 0 | 0 | 0 | 0 | 0 | 0.04 | 0.073333 | 0.213333 | 0.353333 | 0.16 |
| DEF-ST | | 2 | 11th - 20th | 0 | 0 | 0 | 0.006667 | 0.026667 | 0.04 | 0.133333 | 0.22 | 0.2 | 0.146667 |
| DEF-ST | | 3 | 21st - 32th | 0 | 0 | 0 | 0 | 0 | 0.016667 | 0.038889 | 0.105556 | 0.172222 | 0.166667 |
| DL | | 1 | Top 10 | 0 | 0 | 0 | 0 | 0 | 0.006667 | 0.033333 | 0.12 | 0.226667 | 0.28 |
| DL | | 2 | 11th - 30th | 0.013333 | 0 | 0 | 0 | 0.003333 | 0.04 | 0.033333 | 0.163333 | 0.303333 | 0.253333 |
| DL | | 3 | 31st - 100t | 0.080952 | 0 | 0.004762 | 0.001905 | 0.018095 | 0.012381 | 0.052381 | 0.19619 | 0.233333 | 0.167619 |
| DL | | 4 | >100th No | 0.176157 | 0 | 0 | 0.001639 | 0.014748 | 0.035231 | 0.04998 | 0.104056 | 0.170012 | 0.099959 |
| DL | | 5 | Zero Rem | 0.704019 | 0 | 0.084044 | 0.101096 | 0.049939 | 0.034105 | 0.015834 | 0.008526 | 0.002436 | 0 |
| K | | 1 | Top 10 | 0.233333 | 0 | 0 | 0 | 0 | 0 | 0.026667 | 0.166667 | 0.38 | 0.193333 |
| K | | 2 | 11th - 30th | 0.186667 | 0 | 0 | 0 | 0 | 0 | 0.006667 | 0.063333 | 0.343333 | 0.28 |
| K | | 3 | 31st - 100t | 0.2 | 0 | 0 | 0 | 0 | 0 | 0 | 0 | 0 | 0.013333 |
| LB | | 1 | Top 10 | 0.013333 | 0 | 0 | 0 | 0 | 0 | 0.073333 | 0.486667 | 0.293333 | 0.12 |
| LB | | 2 | 11th - 30th | 0.053333 | 0 | 0 | 0 | 0 | 0.006667 | 0.053333 | 0.206667 | 0.236667 | 0.296667 |
| LB | | 3 | 31st - 100t | 0.082857 | 0 | 0.002857 | 0.009524 | 0.005714 | 0.026667 | 0.048571 | 0.097143 | 0.241905 | 0.220952 |
| LB | | 4 | >100th No | 0.133635 | 0 | 0.006229 | 0.007361 | 0.02265 | 0.023783 | 0.083805 | 0.135334 | 0.197055 | 0.103058 |
| LB | | 5 | Zero Rem | 0.807116 | 0.004682 | 0.01779 | 0.040262 | 0.013109 | 0.035581 | 0.035581 | 0.015918 | 0.015918 | 0 |
| P | | 1 | Top 10 | 0.1 | 0 | 0 | 0 | 0 | 0 | 0.026667 | 0.1 | 0.4 | 0.233333 |
| P | | 2 | 11th - 30th | 0.116667 | 0 | 0 | 0 | 0.013333 | 0.066667 | 0.02 | 0.096667 | 0.34 | 0.146667 |
| P | | 3 | 31st - 100t | 0.033333 | 0 | 0 | 0 | 0 | 0 | 0 | 0 | 0 | 0.133333 |
| QB | | 1 | Top 10 | 0.06 | 0 | 0 | 0 | 0 | 0 | 0.053333 | 0.26 | 0.326667 | 0.24 |
| QB | | 2 | 11th - 30th | 0.104895 | 0 | 0.003497 | 0 | 0 | 0 | 0.006993 | 0.143357 | 0.293706 | 0.164336 |
| QB | | 3 | 31st - 100t | 0.220544 | 0.015106 | 0.030211 | 0.009063 | 0.102719 | 0 | 0.009063 | 0.003021 | 0.329305 | 0.012085 |
| RB | | 1 | Top 10 | 0 | 0 | 0 | 0 | 0 | 0.006667 | 0.06 | 0.213333 | 0.28 | 0.286667 |

Figure 5E

|   | N | O | P | Q | R | S | T |
|---|---|---|---|---|---|---|---|
| | 0.101313 | 0.041276 | 0.014071 | 0.007505 | 0.003752 | 0.002814 | 0.000938 |
| | 0.023558 | 0.020309 | 0.021933 | 0.017059 | 0.014622 | 0.010561 | 0.303818 |
| | 0 | 0.003373 | 0.001686 | 0.010118 | 0.005059 | 0.003373 | 0.003373 |
| | | | | | | | |
| | | | | | | | |
| | 0.225806 | 0.354839 | 0.483871 | 0.612903 | 0.741935 | 0.870968 | 1 |
| | 0 | 0 | 0 | 0 | 0 | 0 | 0 |
| | 0.09 | 0.073333 | 0 | 0 | 0 | 0 | 0 |
| | 0.140952 | 0.065714 | 0.024762 | 0.007619 | 0.007619 | 0.001905 | 0.000952 |
| | 0.100689 | 0.049524 | 0.031814 | 0.024926 | 0.008527 | 0.00656 | 0.065267 |
| | 0 | 0 | 0 | 0.004167 | 0.004861 | 0.001389 | 0 |
| | 0.08 | 0.033333 | 0.006667 | 0.026667 | 0.006667 | 0 | 0.006667 |
| | 0.06 | 0.053333 | 0.02 | 0.04 | 0.026667 | 0.006667 | 0.02 |
| | 0.127778 | 0.072222 | 0.066667 | 0.055556 | 0.05 | 0.027778 | 0.1 |
| | 0.186667 | 0.106667 | 0.006667 | 0.02 | 0.006667 | 0.006667 | 0 |
| | 0.146667 | 0.033333 | 0.01 | 0 | 0 | 0 | 0 |
| | 0.098095 | 0.065714 | 0.03619 | 0.014286 | 0.009524 | 0.005714 | 0.002857 |
| | 0.07456 | 0.059812 | 0.050389 | 0.045063 | 0.017616 | 0.010651 | 0.090127 |
| | 0 | 0 | 0 | 0 | 0 | 0 | 0 |
| | 0 | 0 | 0 | 0 | 0 | 0 | 0 |
| | 0.086667 | 0.033333 | 0 | 0 | 0 | 0 | 0 |
| | 0 | 0 | 0.013333 | 0.093333 | 0.24 | 0.146667 | 0.293333 |
| | 0.013333 | 0 | 0 | 0 | 0 | 0 | 0 |
| | 0.086667 | 0.04 | 0.016667 | 0.003333 | 0 | 0 | 0 |
| | 0.11619 | 0.08 | 0.047619 | 0.015238 | 0.004762 | 0 | 0 |
| | 0.078709 | 0.048698 | 0.035674 | 0.035674 | 0.015289 | 0.015289 | 0.057758 |
| | 0 | 0 | 0 | 0 | 0 | 0 | 0.014045 |
| | 0.04 | 0 | 0 | 0 | 0 | 0 | 0.1 |
| | 0.07 | 0.066667 | 0.016667 | 0.02 | 0.006667 | 0.003333 | 0.016667 |
| | 0.166667 | 0.4 | 0.266667 | 0 | 0 | 0 | 0 |
| | 0.053333 | 0.006667 | 0 | 0 | 0 | 0 | 0 |
| | 0.129371 | 0.062937 | 0.052448 | 0.01049 | 0.013986 | 0.01049 | 0.003497 |
| | 0.006042 | 0.006042 | 0.012085 | 0.003021 | 0.006042 | 0.024169 | 0.21148 |
| | 0.1 | 0.026667 | 0.026667 | 0 | 0 | 0 | 0 |

Figure 5F

| Position | AveTier3 |
|---|---|
| DB | 3.890504 |
| DEF-ST | 7.953431 |
| DL | 2.618571 |
| K | 1.578075 |
| LB | 3.835966 |
| P | 2.392647 |
| QB | 0.431312 |
| RB | 3.317899 |
| TE | 0.617731 |
| TMDB | 43.57353 |
| TMDL | 11.41961 |
| TMK | 6.508824 |
| TMLB | 15.33088 |
| TMP | 6.054412 |
| TMQB | 9.648039 |
| TMRB | 14.43676 |
| TMTE | 3.62549 |
| TMWR | 15.00049 |
| WR | 4.313529 |

Figure 6

| A | B | C | D | E | F | G | H | I | J | K | L | M |
|---|---|---|---|---|---|---|---|---|---|---|---|---|
| Position | Tier | Team | Week | PlayerID | -12 | -11 | -10 | -9 | -8 | -7 | -6 | -5 |
| DB | 1 | MIA | 1 | 232 | 7.2 | 7.2 | 7.2 | 7.2 | 7 | 7 | 7 | 7.2 |
| DB | 1 | MIA | 2 | 232 | 7.2 | 7.2 | 7.2 | 7.2 | 7.3 | 7.3 | 7.3 | 7.3 |
| DB | 1 | MIA | 3 | 232 | 7 | 7 | 7 | 7 | 6.6 | 6.6 | 6.6 | 6.8 |
| DB | 1 | MIA | 4 | 232 | 6.8 | 6.8 | 6.8 | 6.8 | 6.7 | 6.7 | 6.7 | 6.8 |
| DB | 1 | MIA | 5 | 232 | 0 | 0 | 0 | 0 | 0 | 0 | 0 | 0 |
| DB | 1 | MIA | 6 | 232 | 7 | 7 | 7 | 7 | 7.2 | 7.2 | 7.2 | 7 |
| DB | 1 | MIA | 7 | 232 | 7.3 | 7.3 | 7.3 | 7.3 | 7.4 | 7.4 | 7.4 | 7.3 |
| DB | 1 | MIA | 8 | 232 | 6.9 | 6.9 | 6.9 | 6.9 | 6.9 | 6.9 | 6.9 | 7 |
| DB | 1 | MIA | 9 | 232 | 6.7 | 6.7 | 6.7 | 6.7 | 6.7 | 6.7 | 6.7 | 6.8 |
| DB | 1 | MIA | 10 | 232 | 7.1 | 7.1 | 7.1 | 7.1 | 6.8 | 6.8 | 6.8 | 7.2 |
| DB | 1 | MIA | 11 | 232 | 7.4 | 7.4 | 7.4 | 7.4 | 7.3 | 7.3 | 7.3 | 7.5 |
| DB | 1 | MIA | 12 | 232 | 6.7 | 6.7 | 6.7 | 6.7 | 6.5 | 6.5 | 6.5 | 6.5 |
| DB | 1 | MIA | 13 | 232 | 7.8 | 7.8 | 7.8 | 7.8 | 7.8 | 7.8 | 7.8 | 7.9 |
| DB | 1 | MIA | 14 | 232 | 7.7 | 7.7 | 7.7 | 7.7 | 7.7 | 7.7 | 7.7 | 7.7 |
| DB | 1 | MIA | 15 | 232 | 6.7 | 6.7 | 6.7 | 6.7 | 6.8 | 6.8 | 6.8 | 6.9 |
| DB | 1 | MIA | 16 | 232 | 6.6 | 6.6 | 6.6 | 6.6 | 6.6 | 6.6 | 6.6 | 6.6 |
| DB | 1 | MIA | 17 | 232 | 7.7 | 7.7 | 7.7 | 7.7 | 7.6 | 7.6 | 7.6 | 7.6 |
| DB | 1 | MIA | 18 | 232 | 113.8 | 113.8 | 113.8 | 113.8 | 112.9 | 112.9 | 112.9 | 114.1 |
| DB | 1 | CHI | 1 | 201 | 6.5 | 6.5 | 6.5 | 6.5 | 6.6 | 6.6 | 6.6 | 6.5 |
| DB | 1 | CHI | 2 | 201 | 7.9 | 7.9 | 7.9 | 7.9 | 7.5 | 7.5 | 7.5 | 7.7 |
| DB | 1 | CHI | 3 | 201 | 7.3 | 7.3 | 7.3 | 7.3 | 7.2 | 7.2 | 7.2 | 7.4 |
| DB | 1 | CHI | 4 | 201 | 7.4 | 7.4 | 7.4 | 7.4 | 7.1 | 7.1 | 7.1 | 7.1 |
| DB | 1 | CHI | 5 | 201 | 7 | 7 | 7 | 7 | 7.1 | 7.1 | 7.1 | 7 |
| DB | 1 | CHI | 6 | 201 | 7.1 | 7.1 | 7.1 | 7.1 | 6.8 | 6.8 | 6.8 | 6.6 |
| DB | 1 | CHI | 7 | 201 | 6.7 | 6.7 | 6.7 | 6.7 | 6.7 | 6.7 | 6.7 | 6.8 |
| DB | 1 | CHI | 8 | 201 | 0 | 0 | 0 | 0 | 0 | 0 | 0 | 0 |
| DB | 1 | CHI | 9 | 201 | 7 | 7 | 7 | 7 | 7 | 7 | 7 | 7 |
| DB | 1 | CHI | 10 | 201 | 7.2 | 7.2 | 7.2 | 7.2 | 7.3 | 7.3 | 7.3 | 7.3 |
| DB | 1 | CHI | 11 | 201 | 7 | 7 | 7 | 7 | 7.3 | 7.3 | 7.3 | 7.2 |
| DB | 1 | CHI | 12 | 201 | 7.4 | 7.4 | 7.4 | 7.4 | 7.5 | 7.5 | 7.5 | 7 |
| DB | 1 | CHI | 13 | 201 | 6.9 | 6.9 | 6.9 | 6.9 | 6.8 | 6.8 | 6.8 | 6.8 |
| DB | 1 | CHI | 14 | 201 | 7.3 | 7.3 | 7.3 | 7.3 | 7 | 7 | 7 | 7 |
| DB | 1 | CHI | 15 | 201 | 7.3 | 7.3 | 7.3 | 7.3 | 7.1 | 7.1 | 7.1 | 7.3 |
| DB | 1 | CHI | 16 | 201 | 7.1 | 7.1 | 7.1 | 7.1 | 7.2 | 7.2 | 7.2 | 7.2 |
| DB | 1 | CHI | 17 | 201 | 6.5 | 6.5 | 6.5 | 6.5 | 7 | 7 | 7 | 6.5 |
| DB | 1 | CHI | 18 | 201 | 113.6 | 113.6 | 113.6 | 113.6 | 113.2 | 113.2 | 113.2 | 112.4 |

Figure 7A

| N | O | P | Q | R | S | T | U | V | W | X | Y |
|---|---|---|---|---|---|---|---|---|---|---|---|
| -4 | -3 | -2 | -1 | 0 | 1 | 2 | 3 | 4 | 5 | 6 | 7 |
| 6.9 | 6.9 | 6.9 | 6.9 | 6 | 6.1 | | | | | | |
| 7.2 | 7.1 | 7.1 | 7.1 | 6.4 | 6.4 | 6 | | | | | |
| 6.9 | 6.9 | 6.9 | 6.9 | 6 | 6.5 | 5.7 | 5.1 | | | | |
| 6.7 | 6.8 | 6.8 | 6.8 | 5.9 | 6.2 | 6 | 5.3 | 5.7 | | | |
| 0 | 0 | 0 | 0 | 0 | 0 | 0 | 0 | 0 | 0 | | |
| 6.9 | 7.2 | 7.2 | 7.2 | 6.2 | 6.6 | 6.2 | 5.6 | 5.8 | 6.3 | 7.2 | |
| 7.5 | 7.2 | 7.2 | 7.2 | 6.5 | 6.7 | 6 | 5.4 | 5.2 | 5.8 | 6.4 | 6.4 |
| 7 | 7 | 7 | 7 | 6.1 | 6.4 | 6.2 | 5.3 | 5.4 | 5.9 | 7.1 | 7.2 |
| 6.7 | 6.6 | 6.6 | 6.6 | 5.8 | 6.3 | 5.9 | 5.4 | 5.3 | 5.8 | 7 | 7.1 |
| 7 | 7 | 7 | 7 | 6.1 | 6.5 | 6 | 5.1 | 5.3 | 5.7 | 6.9 | 7 |
| 7.3 | 7.3 | 7.3 | 7.3 | 6.4 | 6.8 | 5.9 | 5.2 | 5.2 | 5.6 | 6.9 | 7 |
| 6.6 | 6.8 | 6.8 | 6.8 | 6.1 | 6.5 | 6.3 | 5.5 | 5.7 | 5.9 | 7.4 | 7.5 |
| 7.9 | 8.1 | 8.1 | 8.1 | 6.9 | 7 | 6.4 | 5.8 | 5.6 | 5.9 | 7.4 | 7.1 |
| 7.7 | 7.5 | 7.5 | 7.5 | 7 | 7.2 | 6.5 | 5.6 | 5.6 | 6.2 | 7.3 | 7.2 |
| 6.8 | 6.9 | 6.9 | 6.9 | 6 | 6.2 | 5.4 | 5 | 5.2 | 5.6 | 6.8 | 6.8 |
| 6.6 | 6.4 | 6.4 | 6.4 | 5.9 | 6.2 | 5.8 | 5.1 | 5.4 | 5.8 | 7.1 | 7.1 |
| 7.6 | 7.6 | 7.6 | 7.6 | 6.8 | 6.9 | 6.3 | 5.6 | 5.8 | 6.2 | 7.4 | 7.4 |
| 113.3 | 113.3 | 113.3 | 113.3 | 100.1 | 104.5 | 90.6 | 75 | 71.2 | 70.7 | 84.9 | 77.8 |
| 6.6 | 6.3 | 6.3 | 6.3 | 5.9 | 5.5 | | | | | | |
| 7.8 | 7.7 | 7.7 | 7.7 | 7.6 | 6.7 | 6.4 | | | | | |
| 7.3 | 7.1 | 7.1 | 7.1 | 6.6 | 6.5 | 6.5 | 6.1 | | | | |
| 7.2 | 7 | 7 | 7 | 7.1 | 6.5 | 6.3 | 6.6 | 5.6 | | | |
| 7 | 7.4 | 7.4 | 7.4 | 7.3 | 6.1 | 6.3 | 6.2 | 6.1 | 5.9 | | |
| 6.5 | 6.5 | 6.5 | 6.5 | 6.1 | 6 | 5.9 | 5.5 | 5.2 | 5.2 | 6.1 | |
| 7 | 6.8 | 6.8 | 6.8 | 6.8 | 5.8 | 6.6 | 6.4 | 5.9 | 5.9 | 6.9 | 7 |
| 0 | 0 | 0 | 0 | 0 | 0 | 0 | 0 | 0 | 0 | 0 | 0 |
| 6.8 | 7.2 | 7.2 | 7.2 | 7.3 | 6.2 | 6.2 | 6.6 | 6.4 | 6.3 | 7.2 | 7.8 |
| 7.2 | 7.2 | 7.2 | 7.2 | 6.4 | 6.5 | 6.6 | 6.6 | 6.1 | 6 | 6.6 | 6.7 |
| 7.2 | 7.1 | 7.1 | 7.1 | 6.6 | 6.3 | 6.7 | 6.7 | 6.6 | 6.4 | 7.4 | 7.6 |
| 7.2 | 7.3 | 7.3 | 7.3 | 7.5 | 6.1 | 6.2 | 6.4 | 5.8 | 5.9 | 6.7 | 7 |
| 6.7 | 7 | 7 | 7 | 6.2 | 6 | 6.2 | 6.4 | 5.9 | 5.8 | 6.7 | 6.8 |
| 7 | 7 | 7 | 7 | 7.3 | 5.9 | 6.1 | 6.2 | 5.9 | 5.9 | 6.2 | 6.4 |
| 7.5 | 7.2 | 7.2 | 7.2 | 7.3 | 6.3 | 5.7 | 5.4 | 5.1 | 5.2 | 6.3 | 6.3 |
| 7.2 | 7.1 | 7.1 | 7.1 | 7.2 | 6.2 | 6.1 | 6.2 | 6.3 | 5.9 | 6.7 | 7 |
| 6.8 | 6.7 | 6.7 | 6.7 | 6.9 | 5.9 | 5.6 | 5.5 | 5.3 | 5.6 | 6 | 6.8 |
| 113 | 112.6 | 112.6 | 112.6 | 110.1 | 98.5 | 93.4 | 86.8 | 76.2 | 70 | 72.8 | 69.4 |

Figure 7B

| Z | AA | AB | AC | AD | AE | AF | AG | AH | AI | AJ | AK | AL |
|---|---|---|---|---|---|---|---|---|---|---|---|---|
| 8 | 9 | 10 | 11 | 12 | 13 | 14 | 15 | 16 | 17 | | Last | Final |
| | | | | | | | | | | | 6.1 | 5 |
| | | | | | | | | | | | 6 | 4 |
| | | | | | | | | | | | 5.1 | 3 |
| | | | | | | | | | | | 5.7 | 14 |
| | | | | | | | | | | | 0 | 0 |
| | | | | | | | | | | | 7.2 | 7 |
| | | | | | | | | | | | 6.4 | 11 |
| 7.4 | | | | | | | | | | | 7.4 | 5 |
| 7.3 | 7.1 | | | | | | | | | | 7.1 | 5 |
| 7.2 | 7.8 | 7.5 | | | | | | | | | 7.5 | 2 |
| 7.2 | 7.1 | 7.2 | 7.2 | | | | | | | | 7.2 | 7 |
| 7.6 | 7.3 | 7.4 | 7.5 | 7.4 | | | | | | | 7.4 | 4 |
| 7.6 | 7.6 | 7.4 | 7.7 | 7.5 | 7.5 | | | | | | 7.5 | 3 |
| 7.9 | 7.6 | 7.5 | 7.8 | 7.8 | 7.6 | 7.6 | | | | | 7.6 | 6 |
| 7.1 | 6.9 | 6.9 | 7.2 | 7.1 | 7.3 | 7.4 | 7 | | | | 7 | 3 |
| 7.4 | 7.3 | 7.1 | 7.6 | 7.4 | 7.4 | 7.2 | 7.3 | 7.2 | | | 7.2 | 11 |
| 7.7 | 7.6 | 7.8 | 7.9 | 7.8 | 7.9 | 7.8 | 8 | 7.5 | 7.9 | | | |
| 74.4 | 66.3 | 58.8 | 52.9 | 45 | 37.7 | 30 | 22.3 | 14.7 | 7.9 | | | |
| | | | | | | | | | | | 5.5 | 7 |
| | | | | | | | | | | | 6.4 | 7 |
| | | | | | | | | | | | 6.1 | 4 |
| | | | | | | | | | | | 5.6 | 6 |
| | | | | | | | | | | | 5.9 | 8 |
| | | | | | | | | | | | 6.1 | 10 |
| | | | | | | | | | | | 7 | 9 |
| 0 | | | | | | | | | | | 0 | 0 |
| 7.6 | 8.3 | | | | | | | | | | 8.3 | 2 |
| 6.8 | 7.1 | 7 | | | | | | | | | 7 | 21 |
| 7.8 | 8.6 | 8.4 | 8.5 | | | | | | | | 8.5 | 10 |
| 7.3 | 7.9 | 7.8 | 8.1 | 8.2 | | | | | | | 8.2 | 3 |
| 7.1 | 7.3 | 7.2 | 7.3 | 7.9 | 7.8 | | | | | | 7.8 | 8 |
| 6.5 | 7.4 | 7.1 | 7.5 | 7.5 | 7.7 | 8 | | | | | 8 | 9 |
| 6.3 | 6.7 | 6.6 | 7.1 | 7.4 | 7.5 | 7.3 | 7.6 | | | | 7.6 | 1 |
| 7.1 | 7.7 | 7.1 | 7.6 | 7.8 | 8 | 8 | 8 | 7.9 | | | 7.9 | 7 |
| 7.1 | 6.9 | 6.8 | 6.9 | 8 | 7.5 | 7.7 | 8.3 | 8.1 | 7.9 | | | |
| 63.6 | 67.9 | 58 | 53 | 46.8 | 38.5 | 31 | 23.9 | 16 | 7.9 | | | |

Figure 7C

| AN | AO | AP | AQ | AR | AS | AT | AU | AV | AW | AX | AY |
|---|---|---|---|---|---|---|---|---|---|---|---|
| zerpProje | RC | zeroResul | -1 | -0.93548 | -0.80645 | -0.67742 | -0.54839 | -0.41935 | -0.29032 | -0.16129 | -0.03226 |
| 0 | -0.15278 | 0 | 0 | 0 | 0 | 0 | 0 | 0 | 0 | 1 | 0 |
| 0 | -0.11111 | 0 | 0 | 0 | 0 | 0 | 0 | 0 | 0 | 1 | 0 |
| 0 | -0.07143 | 0 | 0 | 0 | 0 | 0 | 0 | 0 | 0 | 0 | 1 |
| 0 | -0.08824 | 0 | 0 | 0 | 0 | 0 | 0 | 0 | 0 | 0 | 1 |
| 1 | | 1 | | | 1 | | 1 | | | | |
| 0 | -0.05714 | 0 | 0 | 0 | 0 | 0 | 0 | 0 | 0 | 0 | 1 |
| 0 | -0.08219 | 0 | 0 | 0 | 0 | 0 | 0 | 0 | 0 | 0 | 1 |
| 0 | -0.07246 | 0 | 0 | 0 | 0 | 0 | 0 | 0 | 0 | 0 | 1 |
| 0 | -0.0597 | 0 | 0 | 0 | 0 | 0 | 0 | 0 | 0 | 0 | 1 |
| 0 | -0.08451 | 0 | 0 | 0 | 0 | 0 | 0 | 0 | 0 | 0 | 1 |
| 0 | -0.08108 | 0 | 0 | 0 | 0 | 0 | 0 | 0 | 0 | 0 | 1 |
| 0 | -0.02985 | 0 | 0 | 0 | 0 | 0 | 0 | 0 | 0 | 0 | 1 |
| 0 | -0.10256 | 0 | 0 | 0 | 0 | 0 | 0 | 0 | 0 | 1 | 0 |
| 0 | -0.06494 | 0 | 0 | 0 | 0 | 0 | 0 | 0 | 0 | 0 | 1 |
| 0 | -0.07463 | 0 | 0 | 0 | 0 | 0 | 0 | 0 | 0 | 0 | 1 |
| 0 | -0.06061 | 0 | 0 | 0 | 0 | 0 | 0 | 0 | 0 | 0 | 1 |
| 0 | -0.1039 | 0 | 0 | 0 | 0 | 0 | 0 | 0 | 0 | 1 | 0 |
| 0 | -0.15385 | 0 | 0 | 0 | 0 | 0 | 0 | 0 | 0 | 1 | 0 |
| 0 | -0.1519 | 0 | 0 | 0 | 0 | 0 | 0 | 0 | 0 | 1 | 0 |
| 0 | -0.10959 | 0 | 0 | 0 | 0 | 0 | 0 | 0 | 0 | 1 | 0 |
| 0 | -0.12162 | 0 | 0 | 0 | 0 | 0 | 0 | 0 | 0 | 1 | 0 |
| 0 | -0.12857 | 0 | 0 | 0 | 0 | 0 | 0 | 0 | 0 | 1 | 0 |
| 0 | -0.15493 | 0 | 0 | 0 | 0 | 0 | 0 | 0 | 0 | 1 | 0 |
| 0 | -0.13433 | 0 | 0 | 0 | 0 | 0 | 0 | 0 | 0 | 1 | 0 |
| 1 | | 1 | | | 1 | | 1 | | | | |
| 0 | -0.11429 | 0 | 0 | 0 | 0 | 0 | 0 | 0 | 0 | 1 | 0 |
| 0 | -0.09722 | 0 | 0 | 0 | 0 | 0 | 0 | 0 | 0 | 1 | 0 |
| 0 | -0.1 | 0 | 0 | 0 | 0 | 0 | 0 | 0 | 0 | 1 | 0 |
| 0 | -0.17568 | 0 | 0 | 0 | 0 | 0 | 0 | 0 | 0 | 1 | 0 |
| 0 | -0.13043 | 0 | 0 | 0 | 0 | 0 | 0 | 0 | 0 | 1 | 0 |
| 0 | -0.19178 | 0 | 0 | 0 | 0 | 0 | 0 | 0 | 0 | 1 | 0 |
| 0 | -0.13699 | 0 | 0 | 0 | 0 | 0 | 0 | 0 | 0 | 1 | 0 |
| 0 | -0.12676 | 0 | 0 | 0 | 0 | 0 | 0 | 0 | 0 | 1 | 0 |
| 0 | -0.09231 | 0 | 0 | 0 | 0 | 0 | 0 | 0 | 0 | 0 | 1 |

Figure 7D

| AZ | BA | BB | BC | BD | BE | BF | BG | BH | BI | BJ | BK | BL |
|---|---|---|---|---|---|---|---|---|---|---|---|---|
| 0.096774 | 0.225806 | 0.354839 | 0.483871 | 0.612903 | 0.741935 | 0.870968 | 1 | | zerpProje | RC | zeroResul | -1 |
| 0 | 0 | 0 | 0 | 0 | 0 | 0 | 0 | | 0 | -0.18033 | 0 | 0 |
| 0 | 0 | 0 | 0 | 0 | 0 | 0 | 0 | | 0 | -0.33333 | 0 | 0 |
| 0 | 0 | 0 | 0 | 0 | 0 | 0 | 0 | | 0 | -0.41176 | 0 | 0 |
| 0 | 0 | 0 | 0 | 0 | 0 | 0 | 0 | | 0 | 1.45614 | 0 | 0 |
| 0 | 0 | 0 | 0 | 0 | 0 | 0 | 0 | | 0 | -0.02778 | 0 | 0 |
| 0 | 0 | 0 | 0 | 0 | 0 | 0 | 0 | | 0 | 0.71875 | 0 | 0 |
| 0 | 0 | 0 | 0 | 0 | 0 | 0 | 0 | | 0 | -0.32432 | 0 | 0 |
| 0 | 0 | 0 | 0 | 0 | 0 | 0 | 0 | | 0 | -0.29577 | 0 | 0 |
| 0 | 0 | 0 | 0 | 0 | 0 | 0 | 0 | | 0 | -0.73333 | 0 | 0 |
| 0 | 0 | 0 | 0 | 0 | 0 | 0 | 0 | | 0 | -0.02778 | 0 | 0 |
| 0 | 0 | 0 | 0 | 0 | 0 | 0 | 0 | | 0 | -0.45946 | 0 | 0 |
| 0 | 0 | 0 | 0 | 0 | 0 | 0 | 0 | | 0 | -0.6 | 0 | 0 |
| 0 | 0 | 0 | 0 | 0 | 0 | 0 | 0 | | 0 | -0.21053 | 0 | 0 |
| 0 | 0 | 0 | 0 | 0 | 0 | 0 | 0 | | 0 | -0.57143 | 0 | 0 |
| 0 | 0 | 0 | 0 | 0 | 0 | 0 | 0 | | 0 | 0.527778 | 0 | 0 |
| 0 | 0 | 0 | 0 | 0 | 0 | 0 | 0 | | 0 | | 0 | 0 |
| 0 | 0 | 0 | 0 | 0 | 0 | 0 | 0 | | 0 | 0.272727 | 0 | 0 |
| 0 | 0 | 0 | 0 | 0 | 0 | 0 | 0 | | 0 | 0.09375 | 0 | 0 |
| 0 | 0 | 0 | 0 | 0 | 0 | 0 | 0 | | 0 | -0.34426 | 0 | 0 |
| 0 | 0 | 0 | 0 | 0 | 0 | 0 | 0 | | 0 | 0.071429 | 0 | 0 |
| 0 | 0 | 0 | 0 | 0 | 0 | 0 | 0 | | 0 | 0.355932 | 0 | 0 |
| 0 | 0 | 0 | 0 | 0 | 0 | 0 | 0 | | 0 | 0.639344 | 0 | 0 |
| 0 | 0 | 0 | 0 | 0 | 0 | 0 | 0 | | 0 | 0.285714 | 0 | 0 |
| 0 | 0 | 0 | 0 | 0 | 0 | 0 | 0 | | 0 | -0.75904 | 0 | 0 |
| 0 | 0 | 0 | 0 | 0 | 0 | 0 | 0 | | 0 | 2 | 0 | 0 |
| 0 | 0 | 0 | 0 | 0 | 0 | 0 | 0 | | 0 | 0.176471 | 0 | 0 |
| 0 | 0 | 0 | 0 | 0 | 0 | 0 | 0 | | 0 | -0.63415 | 0 | 0 |
| 0 | 0 | 0 | 0 | 0 | 0 | 0 | 0 | | 0 | 0.025641 | 0 | 0 |
| 0 | 0 | 0 | 0 | 0 | 0 | 0 | 0 | | 0 | 0.125 | 0 | 0 |
| 0 | 0 | 0 | 0 | 0 | 0 | 0 | 0 | | 0 | -0.86842 | 0 | 0 |
| 0 | 0 | 0 | 0 | 0 | 0 | 0 | 0 | | 0 | -0.11392 | 0 | 0 |
| 0 | 0 | 0 | 0 | 0 | 0 | 0 | 0 | | 0 | | 0 | 0 |

Figure 7E

| A | B | C | D | E | F | G | H | I | J | K | L | M |
|---|---|---|---|---|---|---|---|---|---|---|---|---|
| Pos | Tier | -1 | -0.93548 | -0.80645 | -0.67742 | -0.54839 | -0.41935 | -0.29032 | -0.16129 | -0.03226 | 0.096774 | 0.225806 |
| DB | 1 | 0.10625 | 0 | 0 | 0 | 0.0125 | 0.04375 | 0.04375 | 0.29375 | 0.25625 | 0.1875 | 0.05625 |
| DB | 2 | 0.015625 | 0 | 0 | 0 | 0.003125 | 0 | 0.075 | 0.25 | 0.2375 | 0.253125 | 0.09375 |
| DB | 3 | 0.050893 | 0 | 0 | 0 | 0 | 0.001786 | 0.022321 | 0.216071 | 0.255357 | 0.169643 | 0.15625 |
| DB | 4 | 0.123964 | 0 | 0.00583 | 0 | 0.002455 | 0.007364 | 0.041731 | 0.147898 | 0.224916 | 0.185026 | 0.11568 |
| DB | 5 | 0.895718 | 0 | 0.026243 | 0.015193 | 0.037293 | 0.006906 | 0.006906 | 0.000691 | 0 | 0 | 0 |
| DEF-ST | 1 | 0 | 0 | 0 | 0 | 0 | 0 | 0.1 | 0.2375 | 0.40625 | 0.16875 | 0.08125 |
| DEF-ST | 2 | 0 | 0 | 0 | 0 | 0 | 0.01875 | 0.04375 | 0.2 | 0.28125 | 0.29375 | 0.06875 |
| DEF-ST | 3 | 0 | 0 | 0 | 0 | 0 | 0.010417 | 0.057292 | 0.072917 | 0.239583 | 0.208333 | 0.135417 |
| DL | 1 | 0 | 0 | 0 | 0 | 0 | 0 | 0.01875 | 0.175 | 0.29375 | 0.28125 | 0.19375 |
| DL | 2 | 0.01875 | 0 | 0 | 0 | 0 | 0.003125 | 0.0125 | 0.275 | 0.34375 | 0.2625 | 0.0625 |
| DL | 3 | 0.066964 | 0 | 0 | 0 | 0 | 0.005357 | 0.039286 | 0.195536 | 0.216964 | 0.257143 | 0.110714 |
| DL | 4 | 0.131549 | 0 | 0 | 0 | 0 | 0 | 0.002677 | 0.026386 | 0.105163 | 0.256979 | 0.171319 | 0.141491 |
| DL | 5 | 0.904707 | 0 | 0.034443 | 0.008037 | 0.049369 | 0.003444 | 0 | 0 | 0 | 0 | 0 |
| K | 1 | 0.0375 | 0 | 0 | 0 | 0 | 0 | 0.03125 | 0.15 | 0.64375 | 0.13125 | 0.00625 |
| K | 2 | 0.184375 | 0 | 0 | 0 | 0 | 0 | 0.009375 | 0.0625 | 0.425 | 0.240625 | 0.06875 |
| K | 3 | 0.2 | 0 | 0 | 0 | 0 | 0 | 0 | 0 | 0 | 0.0125 | 0 |
| LB | 1 | 0.0125 | 0 | 0 | 0 | 0 | 0.0625 | 0.05 | 0.40625 | 0.38125 | 0.08125 | 0.00625 |
| LB | 2 | 0.00625 | 0 | 0 | 0 | 0 | 0.015625 | 0.084375 | 0.221875 | 0.284375 | 0.2875 | 0.09375 |
| LB | 3 | 0.073214 | 0 | 0 | 0 | 0 | 0.0125 | 0.015179 | 0.153571 | 0.216964 | 0.253571 | 0.185714 |
| LB | 4 | 0.093617 | 0 | 0.004255 | 0.006383 | 0.003191 | 0.006383 | 0.033511 | 0.140426 | 0.229787 | 0.20266 | 0.123936 |
| LB | 5 | 0.873473 | 0 | 0.022688 | 0.02007 | 0.006108 | 0.013089 | 0.057592 | 0.006108 | 0.000873 | 0 | 0 |
| P | 1 | 0.1 | 0 | 0 | 0 | 0 | 0 | 0 | 0.09375 | 0.475 | 0.23125 | 0 |
| P | 2 | 0.115625 | 0 | 0 | 0 | 0 | 0.046875 | 0.059375 | 0.09375 | 0.334375 | 0.275 | 0.028125 |
| P | 3 | 0.03125 | 0 | 0 | 0 | 0 | 0 | 0 | 0 | 0 | 0.03125 | 0.09375 |
| QB | 1 | 0.0125 | 0 | 0 | 0.00625 | 0 | 0 | 0 | 0.0875 | 0.68125 | 0.2125 | 0 |
| QB | 2 | 0.105263 | 0 | 0 | 0 | 0 | 0 | 0.006579 | 0.184211 | 0.378289 | 0.210526 | 0.042763 |
| QB | 3 | 0.213256 | 0.005764 | 0.005764 | 0.002882 | 0.095101 | 0 | 0.008646 | 0.020173 | 0.414986 | 0.014409 | 0.020173 |
| RB | 1 | 0 | 0 | 0 | 0 | 0 | 0.00625 | 0.03125 | 0.18125 | 0.325 | 0.35625 | 0.09375 |
| RB | 2 | 0 | 0 | 0 | 0 | 0 | 0 | 0.025 | 0.165625 | 0.353125 | 0.31875 | 0.071875 |
| RB | 3 | 0.119643 | 0 | 0.03125 | 0.054464 | 0.049107 | 0.03125 | 0.041964 | 0.113393 | 0.171429 | 0.1125 | 0.063393 |
| RB | 4 | 0.299669 | 0 | 0.011589 | 0.003311 | 0.011589 | 0.014901 | 0.05298 | 0.057947 | 0.155629 | 0.013245 | 0.031457 |
| RB | 5 | 0.914361 | 0.01581 | 0.040843 | 0.018445 | 0.00527 | 0 | 0 | 0 | 0.002635 | 0 | 0 |
| TE | 1 | 0 | 0 | 0 | 0 | 0 | 0.03125 | 0.125 | 0.26875 | 0.2875 | 0.25625 | 0.03125 |

Figure 8A

| N | O | P | Q | R | S | T |
|---|---|---|---|---|---|---|
| 0.354839 | 0.483871 | 0.612903 | 0.741935 | 0.870968 | 1 | |
| 0 | 0 | 0 | 0 | 0 | 0 | |
| 0.065625 | 0.00625 | 0 | 0 | 0 | 0 | |
| 0.079464 | 0.027679 | 0.008929 | 0.00625 | 0.002679 | 0.002679 | |
| 0.060141 | 0.019945 | 0.008285 | 0.006444 | 0.000614 | 0.049709 | |
| 0.000691 | 0.002762 | 0.005525 | 0.001381 | 0.000691 | 0 | |
| 0.00625 | 0 | 0 | 0 | 0 | 0 | |
| 0.075 | 0.0125 | 0 | 0.00625 | 0 | 0 | |
| 0.125 | 0.020833 | 0.067708 | 0.026042 | 0.015625 | 0.020833 | |
| 0.0375 | 0 | 0 | 0 | 0 | 0 | |
| 0.015625 | 0.00625 | 0 | 0 | 0 | 0 | |
| 0.075 | 0.026786 | 0.002679 | 0.002679 | 0 | 0.000893 | |
| 0.057744 | 0.017591 | 0.011472 | 0.004207 | 0.002294 | 0.071128 | |
| 0 | 0 | 0 | 0 | 0 | 0 | |
| 0 | 0 | 0 | 0 | 0 | 0 | |
| 0.009375 | 0 | 0 | 0 | 0 | 0 | |
| 0 | 0.025 | 0.0625 | 0.15 | 0.25 | 0.3 | |
| 0 | 0 | 0 | 0 | 0 | 0 | |
| 0.003125 | 0.003125 | 0 | 0 | 0 | 0 | |
| 0.071429 | 0.016964 | 0.000893 | 0 | 0 | 0 | |
| 0.067553 | 0.030319 | 0.010106 | 0.004787 | 0.001596 | 0.041489 | |
| 0 | 0 | 0 | 0 | 0 | 0 | |
| 0 | 0 | 0 | 0.00625 | 0 | 0.09375 | |
| 0 | 0 | 0.015625 | 0.009375 | 0.00625 | 0.015625 | |
| 0.25 | 0.40625 | 0.15625 | 0.03125 | 0 | 0 | |
| 0 | 0 | 0 | 0 | 0 | 0 | |
| 0.036184 | 0.016447 | 0.009868 | 0.009868 | 0 | 0 | |
| 0.011527 | 0.020173 | 0.014409 | 0.011527 | 0.008646 | 0.132565 | |
| 0.00625 | 0 | 0 | 0 | 0 | 0 | |
| 0.021875 | 0.034375 | 0.00625 | 0.003125 | 0 | 0 | |
| 0.041964 | 0.022321 | 0.016964 | 0.016071 | 0.019643 | 0.094643 | |
| 0.033113 | 0.038079 | 0.016556 | 0.014901 | 0.004967 | 0.240066 | |
| 0.001318 | 0 | 0 | 0 | 0 | 0.001318 | |
| 0 | 0 | 0 | 0 | 0 | 0 | |

Figure 8B

| A | B | C | D | E | F | G | H | I | J | K | L | M |
|---|---|---|---|---|---|---|---|---|---|---|---|---|
| TE | 2 | 0.170347 | 0 | 0.041009 | 0 | 0.025237 | 0.050473 | 0.037855 | 0.132492 | 0.277603 | 0.154574 | 0.069401 |
| TE | 3 | 0.292848 | 0 | 0.055331 | 0.024291 | 0.018893 | 0.025641 | 0.031039 | 0.020243 | 0.103914 | 0.068826 | 0.037787 |
| TE | 5 | 1 | 0 | 0 | 0 | 0 | 0 | 0 | 0 | 0 | 0 | 0 |
| TMDB | 1 | 0 | 0 | 0 | 0 | 0 | 0 | 0 | 0.075 | 0.30625 | 0.54375 | 0.075 | 0 |
| TMDB | 2 | 0 | 0 | 0 | 0 | 0 | 0 | 0 | 0.14375 | 0.425 | 0.40625 | 0.025 |
| TMDB | 3 | 0 | 0 | 0 | 0 | 0 | 0 | 0 | 0.130208 | 0.229167 | 0.421875 | 0.067708 |
| TMDL | 1 | 0 | 0 | 0 | 0 | 0 | 0 | 0.0375 | 0.34375 | 0.33125 | 0.1875 | 0.025 |
| TMDL | 2 | 0 | 0 | 0 | 0 | 0 | 0 | 0.0125 | 0.1125 | 0.4625 | 0.2875 | 0.03125 |
| TMDL | 3 | 0 | 0 | 0 | 0 | 0 | 0.020833 | 0.161458 | 0.203125 | 0.3125 | 0.119792 | 0.041667 |
| TMK | 1 | 0 | 0 | 0 | 0 | 0 | 0 | 0.0125 | 0.1875 | 0.6875 | 0.10625 | 0.00625 |
| TMK | 2 | 0 | 0 | 0 | 0 | 0 | 0 | 0 | 0.075 | 0.625 | 0.26875 | 0.03125 |
| TMK | 3 | 0 | 0 | 0 | 0 | 0 | 0 | 0.005208 | 0.145833 | 0.458333 | 0.286458 | 0.083333 |
| TMLB | 1 | 0 | 0 | 0 | 0 | 0 | 0 | 0.00625 | 0.1875 | 0.575 | 0.225 | 0.00625 |
| TMLB | 2 | 0 | 0 | 0 | 0 | 0 | 0.0125 | 0.1875 | 0.025 | 0.4125 | 0.275 | 0.0875 |
| TMLB | 3 | 0 | 0 | 0 | 0 | 0 | 0 | 0 | 0.15625 | 0.197917 | 0.255208 | 0.25 |
| TMP | 1 | 0 | 0 | 0 | 0.0125 | 0.05625 | 0.03125 | 0 | 0.09375 | 0.475 | 0.23125 | 0 |
| TMP | 2 | 0 | 0 | 0 | 0 | 0 | 0.04375 | 0.3125 | 0.075 | 0.38125 | 0.1875 | 0 |
| TMP | 3 | 0 | 0 | 0 | 0 | 0 | 0.03125 | 0.104167 | 0.057292 | 0.255208 | 0.208333 | 0.010417 |
| TMQB | 1 | 0 | 0 | 0 | 0 | 0 | 0 | 0.00625 | 0.00625 | 0.0625 | 0.7125 | 0.2125 | 0 |
| TMQB | 2 | 0 | 0 | 0 | 0 | 0 | 0.00625 | 0.1375 | 0.28125 | 0.39375 | 0.1625 | 0.01875 |
| TMQB | 3 | 0 | 0 | 0 | 0 | 0 | 0 | 0 | 0.125 | 0.442708 | 0.270833 | 0.135417 |
| TMRB | 1 | 0 | 0 | 0 | 0 | 0 | 0.00625 | 0.09375 | 0.2125 | 0.48125 | 0.19375 | 0.0125 |
| TMRB | 2 | 0 | 0 | 0 | 0 | 0 | 0 | 0.04375 | 0.20625 | 0.29375 | 0.25625 | 0.16875 |
| TMRB | 3 | 0 | 0 | 0 | 0 | 0 | 0.005208 | 0.020833 | 0.0625 | 0.270833 | 0.255208 | 0.203125 |
| TMTE | 1 | 0 | 0 | 0 | 0 | 0.04375 | 0.09375 | 0.2125 | 0.25625 | 0.19375 | 0.175 | 0.025 |
| TMTE | 2 | 0 | 0 | 0 | 0.0875 | 0.1 | 0.09375 | 0.01875 | 0.1 | 0.1625 | 0.28125 | 0.13125 |
| TMTE | 3 | 0 | 0 | 0 | 0.078125 | 0.005208 | 0 | 0.046875 | 0.088542 | 0.208333 | 0.21875 | 0.072917 |
| TMWR | 1 | 0 | 0 | 0 | 0 | 0 | 0 | 0.05625 | 0.10625 | 0.55625 | 0.28125 | 0 |
| TMWR | 2 | 0 | 0 | 0 | 0 | 0 | 0 | 0 | 0.1125 | 0.55625 | 0.2625 | 0.05 |
| TMWR | 3 | 0 | 0 | 0 | 0 | 0 | 0 | 0.026042 | 0.229167 | 0.307292 | 0.203125 | 0.15625 |
| WR | 1 | 0 | 0 | 0 | 0 | 0 | 0 | 0.01875 | 0.1625 | 0.35625 | 0.3875 | 0.05625 |
| WR | 2 | 0 | 0 | 0.009464 | 0.018927 | 0.009464 | 0.009464 | 0 | 0.069401 | 0.463722 | 0.356467 | 0.063091 |
| WR | 3 | 0.04409 | 0 | 0.031895 | 0.047842 | 0.050657 | 0.049719 | 0.050657 | 0.143527 | 0.210131 | 0.199812 | 0.101313 |
| WR | 4 | 0.283509 | 0 | 0.044679 | 0.021121 | 0.025995 | 0.021121 | 0.03818 | 0.032494 | 0.086921 | 0.034119 | 0.023558 |

Figure 8C

| N | O | P | Q | R | S | T |
|---|---|---|---|---|---|---|
| 0.025237 | 0.009464 | 0.003155 | 0.003155 | 0 | 0 | |
| 0.032389 | 0.014845 | 0.010796 | 0.010796 | 0.005398 | 0.246964 | |
| 0 | 0 | 0 | 0 | 0 | 0 | |
| 0 | 0 | 0 | 0 | 0 | 0 | |
| 0 | 0 | 0 | 0 | 0 | 0 | |
| 0.145833 | 0.005208 | 0 | 0 | 0 | 0 | |
| 0.0625 | 0.0125 | 0 | 0 | 0 | 0 | |
| 0.075 | 0.01875 | 0 | 0 | 0 | 0 | |
| 0.109375 | 0.03125 | 0 | 0 | 0 | 0 | |
| 0 | 0 | 0 | 0 | 0 | 0 | |
| 0 | 0 | 0 | 0 | 0 | 0 | |
| 0.020833 | 0 | 0 | 0 | 0 | 0 | |
| 0 | 0 | 0 | 0 | 0 | 0 | |
| 0 | 0 | 0 | 0 | 0 | 0 | |
| 0.078125 | 0.03125 | 0.03125 | 0 | 0 | 0 | |
| 0 | 0 | 0 | 0.00625 | 0 | 0.09375 | |
| 0 | 0 | 0 | 0 | 0 | 0 | |
| 0.036458 | 0.098958 | 0.03125 | 0.03125 | 0.041667 | 0.09375 | |
| 0 | 0 | 0 | 0 | 0 | 0 | |
| 0 | 0 | 0 | 0 | 0 | 0 | |
| 0.026042 | 0 | 0 | 0 | 0 | 0 | |
| 0 | 0 | 0 | 0 | 0 | 0 | |
| 0.01875 | 0.0125 | 0 | 0 | 0 | 0 | |
| 0.09375 | 0.057292 | 0.026042 | 0 | 0.005208 | 0 | |
| 0 | 0 | 0 | 0 | 0 | 0 | |
| 0.025 | 0 | 0 | 0 | 0 | 0 | |
| 0.015625 | 0.026042 | 0.020833 | 0.015625 | 0.005208 | 0.197917 | |
| 0 | 0 | 0 | 0 | 0 | 0 | |
| 0.01875 | 0 | 0 | 0 | 0 | 0 | |
| 0.067708 | 0.010417 | 0 | 0 | 0 | 0 | |
| 0.0125 | 0.00625 | 0 | 0 | 0 | 0 | |
| 0 | 0 | 0 | 0 | 0 | 0 | |
| 0.041276 | 0.014071 | 0.007505 | 0.003752 | 0.002814 | 0.000938 | |
| 0.020309 | 0.021933 | 0.017059 | 0.014622 | 0.010561 | 0.303818 | |

Figure 8D

| A | B | C | D | E | F | G | H | I | J | K | L | M |
|---|---|---|---|---|---|---|---|---|---|---|---|---|
| WR | | 5 | 0.822934 | 0.096121 | 0.008432 | 0.021922 | 0.016863 | 0.006745 | 0 | 0 | 0 | 0 | 0 |
| | | | | | | | | | | | | | |
| ACCURACY | | | | | | | | | | | | | |
| Pos | Tier | | -1 | -0.93548 | -0.80645 | -0.67742 | -0.54839 | -0.41935 | -0.29032 | -0.16129 | -0.03226 | 0.096774 | 0.225806 |
| DB | | 1 | 0.067797 | 0 | 0.09322 | 0.042373 | 0.09322 | 0.084746 | 0.084746 | 0.09322 | 0.101695 | 0.076271 | 0.050847 |
| DB | | 2 | 0.123596 | 0 | 0.074906 | 0.078652 | 0.104869 | 0.089888 | 0.104869 | 0.082397 | 0.033708 | 0.052434 | 0.052434 |
| DB | | 3 | 0.230256 | 0 | 0.068966 | 0.050056 | 0.095662 | 0.068966 | 0.074527 | 0.05228 | 0.068966 | 0.058954 | 0.035595 |
| DB | | 4 | 0.446412 | 0.000466 | 0.014911 | 0.043802 | 0.039143 | 0.035881 | 0.042404 | 0.031221 | 0.036813 | 0.027027 | 0.025629 |
| DB | | 5 | 0.587669 | 0 | 0.007707 | 0.013487 | 0.028902 | 0.023121 | 0.013487 | 0.007707 | 0.026975 | 0.028902 | 0.017341 |
| DEF-ST | | 1 | 0.062069 | 0 | 0.048276 | 0.082759 | 0.144828 | 0.137931 | 0.068966 | 0.096552 | 0.068966 | 0.027586 | 0.041379 |
| DEF-ST | | 2 | 0.130137 | 0 | 0.047945 | 0.123288 | 0.061644 | 0.116438 | 0.034247 | 0.061644 | 0.068493 | 0.041096 | 0.047945 |
| DEF-ST | | 3 | 0.061111 | 0 | 0.072222 | 0.122222 | 0.072222 | 0.111111 | 0.077778 | 0.094444 | 0.094444 | 0.027778 | 0.044444 |
| DL | | 1 | 0.144828 | 0 | 0.089655 | 0.082759 | 0.082759 | 0.075862 | 0.075862 | 0.055172 | 0.048276 | 0.055172 | 0.048276 |
| DL | | 2 | 0.276978 | 0 | 0.07554 | 0.064748 | 0.053957 | 0.061151 | 0.05036 | 0.039568 | 0.053957 | 0.043165 | 0.02518 |
| DL | | 3 | 0.308041 | 0 | 0.02718 | 0.09513 | 0.088335 | 0.062288 | 0.06342 | 0.043035 | 0.04077 | 0.039638 | 0.026048 |
| DL | | 4 | 0.530194 | 0 | 0.003324 | 0.017175 | 0.042659 | 0.037673 | 0.045983 | 0.018837 | 0.031025 | 0.018837 | 0.027147 |
| DL | | 5 | 0.495298 | 0 | 0.003135 | 0.018809 | 0.012539 | 0.037618 | 0.025078 | 0.015674 | 0.043887 | 0.003135 | 0.028213 |
| K | | 1 | 0.019231 | 0 | 0.057692 | 0.019231 | 0.057692 | 0.105769 | 0.105769 | 0.125 | 0.048077 | 0.086538 | 0.115385 |
| K | | 2 | 0.019685 | 0 | 0.03937 | 0.07874 | 0.07874 | 0.114173 | 0.090551 | 0.098425 | 0.082677 | 0.062992 | 0.086614 |
| K | | 3 | 0.011111 | 0 | 0.033333 | 0.033333 | 0.033333 | 0.055556 | 0.122222 | 0.211111 | 0.1 | 0.1 | 0.066667 |
| LB | | 1 | 0.133803 | 0 | 0.077465 | 0.098592 | 0.091549 | 0.077465 | 0.070423 | 0.084507 | 0.042254 | 0.042254 | 0.056338 |
| LB | | 2 | 0.094545 | 0 | 0.054545 | 0.08 | 0.101818 | 0.069091 | 0.098182 | 0.072727 | 0.058182 | 0.08 | 0.069091 |
| LB | | 3 | 0.228743 | 0 | 0.062275 | 0.074251 | 0.064671 | 0.062275 | 0.065868 | 0.062275 | 0.058683 | 0.063473 | 0.033533 |
| LB | | 4 | 0.559348 | 0 | 0.006982 | 0.027929 | 0.024825 | 0.031032 | 0.026377 | 0.021722 | 0.028704 | 0.022498 | 0.019395 |
| LB | | 5 | 0.529221 | 0 | 0.003247 | 0.019481 | 0.019481 | 0.045455 | 0.019481 | 0.025974 | 0.025974 | 0.022727 | 0.022727 |
| P | | 1 | 0.976563 | 0 | 0.015625 | 0.007813 | 0 | 0 | 0 | 0 | 0 | 0 | 0 |
| P | | 2 | 0.984615 | 0 | 0.003846 | 0 | 0.003846 | 0.003846 | 0 | 0 | 0 | 0.003846 | 0 |
| P | | 3 | 1 | 0 | 0 | 0 | 0 | 0 | 0 | 0 | 0 | 0 | 0 |
| QB | | 1 | 0.030303 | 0 | 0.007576 | 0.007576 | 0.045455 | 0.030303 | 0.106061 | 0.113636 | 0.121212 | 0.128788 | 0.136364 |
| QB | | 2 | 0.09205 | 0.004184 | 0.029289 | 0.025105 | 0.029289 | 0.050209 | 0.079498 | 0.096234 | 0.066946 | 0.087866 | 0.087866 |
| QB | | 3 | 0.704225 | 0 | 0.012072 | 0.002012 | 0.008048 | 0.018109 | 0.018109 | 0.014085 | 0.028169 | 0.016097 | 0.016097 |
| RB | | 1 | 0.039683 | 0 | 0.031746 | 0.095238 | 0.047619 | 0.071429 | 0.071429 | 0.071429 | 0.087302 | 0.134921 | 0.047619 |
| RB | | 2 | 0.09434 | 0 | 0.060377 | 0.049057 | 0.09434 | 0.071698 | 0.098113 | 0.064151 | 0.030189 | 0.045283 | 0.067925 |
| RB | | 3 | 0.230867 | 0.005102 | 0.067602 | 0.0625 | 0.054847 | 0.0625 | 0.052296 | 0.053571 | 0.057398 | 0.035714 | 0.030612 |

Figure 8E

| N | O | P | Q | R | S | T |
|---|---|---|---|---|---|---|
| 0.003373 | 0.001686 | 0.010118 | 0.005059 | 0.003373 | 0.003373 | |
| | | | | | | |
| 0.354839 | 0.483871 | 0.612903 | 0.741935 | 0.870968 | 1 | |
| 0.033898 | 0.050847 | 0.025424 | 0.016949 | 0.025424 | 0.059322 | 118 |
| 0.037453 | 0.033708 | 0.033708 | 0.037453 | 0.022472 | 0.037453 | 267 |
| 0.040044 | 0.028921 | 0.027809 | 0.023359 | 0.015573 | 0.060067 | 899 |
| 0.023765 | 0.024697 | 0.028425 | 0.00932 | 0.017707 | 0.152377 | 2146 |
| 0.011561 | 0.013487 | 0.026975 | 0.007707 | 0.013487 | 0.171484 | 519 |
| 0.027586 | 0.034483 | 0.006897 | 0.02069 | 0.02069 | 0.110345 | 145 |
| 0.013699 | 0.006849 | 0.027397 | 0.013699 | 0.034247 | 0.171233 | 146 |
| 0.016667 | 0.022222 | 0.016667 | 0.011111 | 0.022222 | 0.133333 | 180 |
| 0.034483 | 0.048276 | 0.013793 | 0.041379 | 0.013793 | 0.089655 | 145 |
| 0.039568 | 0.017986 | 0.028777 | 0.021583 | 0.043165 | 0.104317 | 278 |
| 0.015855 | 0.023783 | 0.020385 | 0.011325 | 0.012458 | 0.12231 | 883 |
| 0.012742 | 0.025485 | 0.019391 | 0.007202 | 0.018283 | 0.144044 | 1805 |
| 0 | 0.040752 | 0.021944 | 0.003135 | 0.025078 | 0.225705 | 319 |
| 0.057692 | 0.038462 | 0.048077 | 0.028846 | 0.048077 | 0.038462 | 104 |
| 0.043307 | 0.03937 | 0.043307 | 0.03937 | 0.027559 | 0.055118 | 254 |
| 0.055556 | 0.022222 | 0.066667 | 0.044444 | 0 | 0.044444 | 90 |
| 0.091549 | 0.042254 | 0.007042 | 0.028169 | 0.014085 | 0.042254 | 142 |
| 0.050909 | 0.036364 | 0.029091 | 0.025455 | 0.014545 | 0.065455 | 275 |
| 0.034731 | 0.037126 | 0.02994 | 0.020359 | 0.023952 | 0.077844 | 835 |
| 0.015516 | 0.019395 | 0.022498 | 0.006206 | 0.013964 | 0.153607 | 1289 |
| 0.016234 | 0.032468 | 0.022727 | 0 | 0.00974 | 0.185065 | 308 |
| 0 | 0 | 0 | 0 | 0 | 0 | 128 |
| 0 | 0 | 0 | 0 | 0 | 0 | 260 |
| 0 | 0 | 0 | 0 | 0 | 0 | 36 |
| 0.037879 | 0.090909 | 0.037879 | 0.05303 | 0.030303 | 0.022727 | 132 |
| 0.087866 | 0.058577 | 0.037657 | 0.041841 | 0.029289 | 0.096234 | 239 |
| 0.016097 | 0.008048 | 0.016097 | 0.018109 | 0.014085 | 0.090543 | 497 |
| 0.079365 | 0.055556 | 0.039683 | 0.015873 | 0.031746 | 0.079365 | 126 |
| 0.033962 | 0.041509 | 0.033962 | 0.045283 | 0.022642 | 0.14717 | 265 |
| 0.02551 | 0.022959 | 0.026786 | 0.029337 | 0.017857 | 0.164541 | 784 |

Figure 8F

| A | B | C | D | E | F | G | H | I | J | K | L | M |
|---|---|---|---|---|---|---|---|---|---|---|---|---|
| RB | 4 | 0.567282 | 0.005277 | 0.031662 | 0.039578 | 0.023747 | 0.036939 | 0.021108 | 0.023747 | 0.01847 | 0.015831 | 0.023747 |
| RB | 5 | 0.472727 | 0.012121 | 0.018182 | 0.036364 | 0.048485 | 0.024242 | 0.042424 | 0.012121 | 0.018182 | 0.012121 | 0.012121 |
| TE | 1 | 0.057554 | 0 | 0.057554 | 0.086331 | 0.100719 | 0.086331 | 0.079137 | 0.107914 | 0.05036 | 0.035971 | 0.043165 |
| TE | 2 | 0.175214 | 0 | 0.08547 | 0.08547 | 0.059829 | 0.051282 | 0.051282 | 0.047009 | 0.047009 | 0.017094 | 0.047009 |
| TE | 3 | 0.490942 | 0 | 0.01087 | 0.019928 | 0.043478 | 0.032609 | 0.036232 | 0.03442 | 0.023551 | 0.019928 | 0.018116 |
| TE | 5 | 0.714286 | 0 | 0.035714 | 0.071429 | 0.035714 | 0.035714 | 0 | 0 | 0 | 0.035714 | 0 |
| TMDB | 1 | 0 | 0 | 0 | 0.02 | 0.033333 | 0.166667 | 0.213333 | 0.2 | 0.14 | 0.093333 | 0.053333 |
| TMDB | 2 | 0 | 0 | 0 | 0.02 | 0.04 | 0.186667 | 0.153333 | 0.193333 | 0.153333 | 0.113333 | 0.033333 |
| TMDB | 3 | 0 | 0 | 0 | 0.022222 | 0.066667 | 0.088889 | 0.15 | 0.205556 | 0.166667 | 0.105556 | 0.077778 |
| TMDL | 1 | 0 | 0 | 0.013423 | 0.053691 | 0.107383 | 0.154362 | 0.167785 | 0.134228 | 0.120805 | 0.053691 | 0.087248 |
| TMDL | 2 | 0 | 0 | 0.020134 | 0.09396 | 0.087248 | 0.107383 | 0.114094 | 0.147651 | 0.120805 | 0.073826 | 0.04698 |
| TMDL | 3 | 0.005714 | 0 | 0.028571 | 0.062857 | 0.114286 | 0.097143 | 0.102857 | 0.137143 | 0.102857 | 0.097143 | 0.068571 |
| TMK | 1 | 0.006849 | 0 | 0.047945 | 0.020548 | 0.061644 | 0.082192 | 0.123288 | 0.164384 | 0.09589 | 0.09589 | 0.09589 |
| TMK | 2 | 0.033557 | 0 | 0.040268 | 0.04698 | 0.067114 | 0.09396 | 0.080537 | 0.127517 | 0.087248 | 0.073826 | 0.107383 |
| TMK | 3 | 0.011173 | 0 | 0.03352 | 0.089385 | 0.067039 | 0.111732 | 0.100559 | 0.089385 | 0.067039 | 0.067039 | 0.078212 |
| TMLB | 1 | 0 | 0 | 0.006667 | 0.033333 | 0.086667 | 0.14 | 0.186667 | 0.146667 | 0.133333 | 0.126667 | 0.04 |
| TMLB | 2 | 0 | 0 | 0.026667 | 0.06 | 0.066667 | 0.14 | 0.166667 | 0.153333 | 0.12 | 0.113333 | 0.033333 |
| TMLB | 3 | 0 | 0 | 0 | 0.022222 | 0.127778 | 0.155556 | 0.144444 | 0.138889 | 0.083333 | 0.116667 | 0.1 |
| TMP | 1 | 0.979866 | 0 | 0.013423 | 0.006711 | 0 | 0 | 0 | 0 | 0 | 0 | 0 |
| TMP | 2 | 0.986577 | 0 | 0.006711 | 0 | 0 | 0.006711 | 0 | 0 | 0 | 0 | 0 |
| TMP | 3 | 0.988889 | 0 | 0 | 0 | 0.005556 | 0 | 0 | 0 | 0 | 0.005556 | 0 |
| TMQB | 1 | 0.013423 | 0 | 0.013423 | 0.020134 | 0.040268 | 0.040268 | 0.120805 | 0.100671 | 0.14094 | 0.14094 | 0.087248 |
| TMQB | 2 | 0.04 | 0 | 0.033333 | 0.02 | 0.04 | 0.08 | 0.06 | 0.093333 | 0.1 | 0.113333 | 0.066667 |
| TMQB | 3 | 0.011111 | 0 | 0.033333 | 0.027778 | 0.022222 | 0.05 | 0.083333 | 0.088889 | 0.072222 | 0.077778 | 0.116667 |
| TMRB | 1 | 0 | 0 | 0.006667 | 0.02 | 0.093333 | 0.086667 | 0.073333 | 0.113333 | 0.14 | 0.133333 | 0.086667 |
| TMRB | 2 | 0 | 0.006667 | 0 | 0.026667 | 0.066667 | 0.126667 | 0.153333 | 0.066667 | 0.086667 | 0.073333 | 0.106667 |
| TMRB | 3 | 0 | 0 | 0.016667 | 0.027778 | 0.083333 | 0.116667 | 0.083333 | 0.1 | 0.111111 | 0.111111 | 0.061111 |
| TMTE | 1 | 0.006944 | 0 | 0.027778 | 0.055556 | 0.138889 | 0.055556 | 0.069444 | 0.090278 | 0.076389 | 0.048611 | 0.055556 |
| TMTE | 2 | 0.053333 | 0.006667 | 0.06 | 0.06 | 0.12 | 0.073333 | 0.08 | 0.046667 | 0.066667 | 0.053333 | 0.06 |
| TMTE | 3 | 0.08427 | 0 | 0.101124 | 0.095506 | 0.089888 | 0.044944 | 0.078652 | 0.050562 | 0.05618 | 0.033708 | 0.044944 |
| TMWR | 1 | 0.006667 | 0 | 0 | 0.013333 | 0.046667 | 0.086667 | 0.106667 | 0.1 | 0.086667 | 0.113333 | 0.106667 |
| TMWR | 2 | 0 | 0 | 0.020134 | 0.067114 | 0.04698 | 0.053691 | 0.100671 | 0.09396 | 0.120805 | 0.120805 | 0.09396 |
| TMWR | 3 | 0.005556 | 0 | 0.005556 | 0.033333 | 0.022222 | 0.038889 | 0.083333 | 0.122222 | 0.105556 | 0.105556 | 0.072222 |
| WR | 1 | 0.074627 | 0 | 0.074627 | 0.074627 | 0.067164 | 0.059701 | 0.097015 | 0.037313 | 0.052239 | 0.097015 | 0.08209 |

Figure 8G

| N | O | P | Q | R | S | T |
|---|---|---|---|---|---|---|
| 0.005277 | 0.007916 | 0.007916 | 0.007916 | 0.010554 | 0.153034 | 379 |
| 0.024242 | 0.036364 | 0.018182 | 0.018182 | 0.006061 | 0.187879 | 165 |
| 0.035971 | 0.021583 | 0.043165 | 0.043165 | 0.028777 | 0.122302 | 139 |
| 0.047009 | 0.021368 | 0.012821 | 0.025641 | 0.017094 | 0.209402 | 234 |
| 0.021739 | 0.01087 | 0.009058 | 0.016304 | 0.01087 | 0.201087 | 552 |
| 0 | 0 | 0.035714 | 0.035714 | 0 | 0 | 28 |
| 0.026667 | 0.02 | 0.013333 | 0.013333 | 0 | 0.006667 | 150 |
| 0.033333 | 0.026667 | 0.02 | 0.013333 | 0 | 0.013333 | 150 |
| 0.033333 | 0.005556 | 0.022222 | 0.022222 | 0.016667 | 0.016667 | 180 |
| 0.033557 | 0.026846 | 0 | 0.033557 | 0.013423 | 0 | 149 |
| 0.060403 | 0.020134 | 0.040268 | 0.013423 | 0.013423 | 0.040268 | 149 |
| 0.057143 | 0.017143 | 0.045714 | 0.005714 | 0.022857 | 0.034286 | 175 |
| 0.061644 | 0.027397 | 0.027397 | 0.020548 | 0.027397 | 0.041096 | 146 |
| 0.060403 | 0.020134 | 0.033557 | 0.053691 | 0.026846 | 0.04698 | 149 |
| 0.027933 | 0.061453 | 0.072626 | 0.039106 | 0.022346 | 0.061453 | 179 |
| 0.033333 | 0.04 | 0.006667 | 0.013333 | 0.006667 | 0 | 150 |
| 0.026667 | 0.026667 | 0.04 | 0.013333 | 0.006667 | 0.006667 | 150 |
| 0.05 | 0.033333 | 0.005556 | 0.005556 | 0 | 0.016667 | 180 |
| 0 | 0 | 0 | 0 | 0 | 0 | 149 |
| 0 | 0 | 0 | 0 | 0 | 0 | 149 |
| 0 | 0 | 0 | 0 | 0 | 0 | 180 |
| 0.053691 | 0.073826 | 0.053691 | 0.040268 | 0.033557 | 0.026846 | 149 |
| 0.106667 | 0.073333 | 0.04 | 0.04 | 0.02 | 0.073333 | 150 |
| 0.072222 | 0.027778 | 0.088889 | 0.038889 | 0.05 | 0.138889 | 180 |
| 0.073333 | 0.033333 | 0.026667 | 0.033333 | 0.033333 | 0.046667 | 150 |
| 0.113333 | 0.073333 | 0.026667 | 0.046667 | 0.006667 | 0.02 | 150 |
| 0.055556 | 0.05 | 0.038889 | 0.044444 | 0.016667 | 0.083333 | 180 |
| 0.076389 | 0.069444 | 0.055556 | 0.041667 | 0.020833 | 0.111111 | 144 |
| 0.033333 | 0.033333 | 0.026667 | 0.04 | 0.026667 | 0.16 | 150 |
| 0.039326 | 0.016854 | 0.02809 | 0.011236 | 0.016854 | 0.207865 | 178 |
| 0.126667 | 0.073333 | 0.033333 | 0.033333 | 0.026667 | 0.04 | 150 |
| 0.053691 | 0.053691 | 0.073826 | 0.013423 | 0.04698 | 0.040268 | 149 |
| 0.1 | 0.044444 | 0.033333 | 0.061111 | 0.027778 | 0.138889 | 180 |
| 0.059701 | 0.052239 | 0.029851 | 0.014925 | 0.022388 | 0.104478 | 134 |

Figure 8H

COMPUTERIZED SYSTEM AND METHOD FOR CALIBRATING SPORTS STATISTICS PROJECTIONS BY PLAYER PERFORMANCE TIERS

RELATED APPLICATIONS

This application claims priority to U.S. Provisional Application No. 61/687,100, filed Apr. 18, 2012 the contents of which is hereby incorporated by reference herein.

FIELD OF THE INVENTION

The present invention relates to calibrating sports statistics projections by player performance tiers and more particularly to a computerized system and method for using historical player projection data to build non-normal probability distributions for various tiers of player performance.

BACKGROUND OF THE INVENTION

Sports statistics projections are a forecast of how players in a particular sports league will perform as measured by a commonly accepted set of performance statistics for that particular sport, such as the number of passing touchdowns for a quarterback in the NFL. Such projections are used by many companies to provide team management guidance tools for assisting with player selection decisions such as drafting players at the beginning of the fantasy sports season.

The majority of currently available tools for sports statistics projections simply use projected values to compare players and analyze their value when providing guidance to the fantasy sports end-user. Probability distributions are used to model the relationship between projections and the actual results, thus providing more accurate player selection guidance. See, for example, Applicant's own work, U.S. patent application Ser. No. 13/520,254, which is incorporated by reference in its entirety. The probability distributions used in current player selection guidance software use normal distribution models to create probability distributions from player statistics projections.

It is recognized that previous models assume all players have equal upside and downside relative to their projected performance regardless of whether they are projected to be a top-tier player or a lower-tier player. In reality, players that are projected to perform at the very top of their respective sports league (top-tier players) generally have a smaller probability of significantly improving compared with the probability of having a degraded performance over the course of a sports season.

Probability distribution-based player selection guidance systems that use a normal distribution model tend to overvalue top-tier players and undervalue lower-tier players and are only able to provide starting lineup guidance based on mean projected values. The system and method of the present invention for creating and using tier-specific, non-normal distributions provides player selection guidance that realistically values top-tier and lower-tier players and provides situational based starting lineup recommendations.

SUMMARY OF THE INVENTION

The system and method of the present invention provides team guidance recommendations. More particularly, the system and method of the present invention provides player selection guidance by realistically valuing top-tier and lower-tier players. In one embodiment, the system and method of the preset invention provides situational-based starting lineup recommendations by creating and using tier-specific, non-normal distributions in a probability distribution-based system for providing fantasy sports player selection guidance. The system and method generates variance and accuracy information from historical data of a particular player projection system, and generates non-normal fantasy point distributions from the same player projection system using the previously generated variance and accuracy information.

It has been recognized that there is a need for a computerized system and method for using historical player projection data to build non-normal probability distributions for various tiers of player performance to represent projection variance and projection accuracy, which can later be used to modify future projections to facilitate realistic upside and downside calibration for each player performance tier.

One aspect of the present invention is a computer-implemented method for using historical player projection data to build non-normal probability distributions for various tiers of player performance, comprising: providing an archive of player fantasy point projections, wherein the archive comprises fantasy point projection data; calculating tiered probability distributions of projection variances using the fantasy point projection data; calculating tiered probability distributions of projection accuracy using the fantasy point projection data; and creating non-normal fantasy point probability distributions from future player statistics projections thereby providing users with fantasy sport team management guidance.

One embodiment of the computer-implemented method for using historical player projection data to build non-normal probability distributions for various tiers of player performance is wherein the archive comprises AccuScore NFL player fantasy point projections.

One embodiment of the computer-implemented method for using historical player projection data to build non-normal probability distributions for various tiers of player performance further comprises providing new player statistics projections.

One embodiment of the computer-implemented method for using historical player projection data to build non-normal probability distributions for various tiers of player performance is wherein calculating tiered probability distributions of the projection accuracy is based on the tiers from week −12.

One embodiment of the computer-implemented method for using historical player projection data to build non-normal probability distributions for various tiers of player performance is wherein calculating tiered probability distributions of the projection variance uses the average of Tier 3 players to approximate the variance for Tier 5 players.

One embodiment of the computer-implemented method for using historical player projection data to build non-normal probability distributions for various tiers of player performance is wherein the fantasy sport team management guidance comprises starting lineup recommendations.

Another aspect of the present invention is a computer system for using historical player projection data to build non-normal probability distributions for various tiers of player performance, comprising: providing an archive of player fantasy point projections, wherein the archive comprises fantasy point projection data; calculating tiered probability distributions of projection variances using the fantasy point projection data; calculating tiered probability distributions of projection accuracy using the fantasy point projection data; and creating non-normal fantasy point probability distributions from future player statistics projections thereby providing users with fantasy sport team management guidance.

One embodiment of the computer system for using historical player projection data to build non-normal probability distributions for various tiers of player performance is wherein the archive comprises AccuScore NFL player fantasy point projections.

One embodiment of the computer system for using historical player projection data to build non-normal probability distributions for various tiers of player performance further comprises providing new player statistics projections.

One embodiment of the computer system for using historical player projection data to build non-normal probability distributions for various tiers of player performance is wherein calculating tiered probability distributions of the projection accuracy is based on the tiers from week −12.

One embodiment of the computer system for using historical player projection data to build non-normal probability distributions for various tiers of player performance is wherein calculating tiered probability distributions of the projection variance uses the average of Tier 3 players to approximate the variance for Tier 5 players.

One embodiment of the computer system for using historical player projection data to build non-normal probability distributions for various tiers of player performance is wherein the fantasy sport team management guidance comprises starting lineup recommendations.

Another aspect of the present invention is a non-transitory computer program product comprising program instructions encoded on one or more computer readable mediums that when executed by one or more processors causes a process for using historical player projections to build non-normal probability distributions to be carried out, the process comprising: providing an archive of player fantasy point projections, wherein the archive comprises fantasy point projection data; calculating tiered probability distributions of projection variances using the fantasy point projection data; calculating tiered probability distributions of projection accuracy using the fantasy point projection data; and creating non-normal fantasy point probability distributions from future player statistics projections thereby providing users with fantasy sport team management guidance.

One embodiment of the non-transitory computer program product for using historical player projection data to build non-normal probability distributions for various tiers of player performance is wherein the archive comprises AccuScore NFL player fantasy point projections.

One embodiment of the non-transitory computer program product for using historical player projection data to build non-normal probability distributions for various tiers of player performance further comprises providing new player statistics projections.

One embodiment of the non-transitory computer program product for using historical player projection data to build non-normal probability distributions for various tiers of player performance is wherein calculating tiered probability distributions of the projection accuracy is based on the tiers from week −12.

One embodiment of the non-transitory computer program product for using historical player projection data to build non-normal probability distributions for various tiers of player performance is wherein calculating tiered probability distributions of the projection variance uses the average of Tier 3 players to approximate the variance for Tier 5 players.

One embodiment of the non-transitory computer program product for using historical player projection data to build non-normal probability distributions for various tiers of player performance is wherein the fantasy sport team management guidance comprises starting lineup recommendations.

Two compact disks are submitted with this application. Original compact disks were submitted upon filing of the initial priority application. The two compact disks contain no new matter. The compact disks are submitted in duplicate and are incorporated by reference in their entirety. The titles of the two compact disks are COPY 1 Apr. 9, 2013 and COPY 2 Apr. 9, 2013, respectively. The two compact disks are identical and contain two files, namely, Table 1.csv and Table2.csv. Table 1.csv was created on Apr. 16, 2012 and contains 3,501,138 bytes. Table2.csv was created on Apr. 16, 2012 and contains 7,518,501 bytes. Table 1.csv is referred to in the remainder of the application as "Attachment 1," and Table2.csv is referred to as "Attachment 2" throughout the remainder of the application.

These aspects of the invention are not meant to be exclusive and other features, aspects, and advantages of the present invention will be readily apparent to those of ordinary skill in the art when read in conjunction with the following description, appended claims, and accompanying drawings.

BRIEF DESCRIPTION OF THE DRAWINGS

The foregoing and other objects, features, and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

Attachment 1 (refer to attached CD-ROM) is a Microsoft Excel Worksheet that demonstrates an embodiment of the present invention for tiered projection variance and accuracy distributions for all player positions from all weeks to all weeks based on analysis of 2011 AccuScore data.

Figure 2:
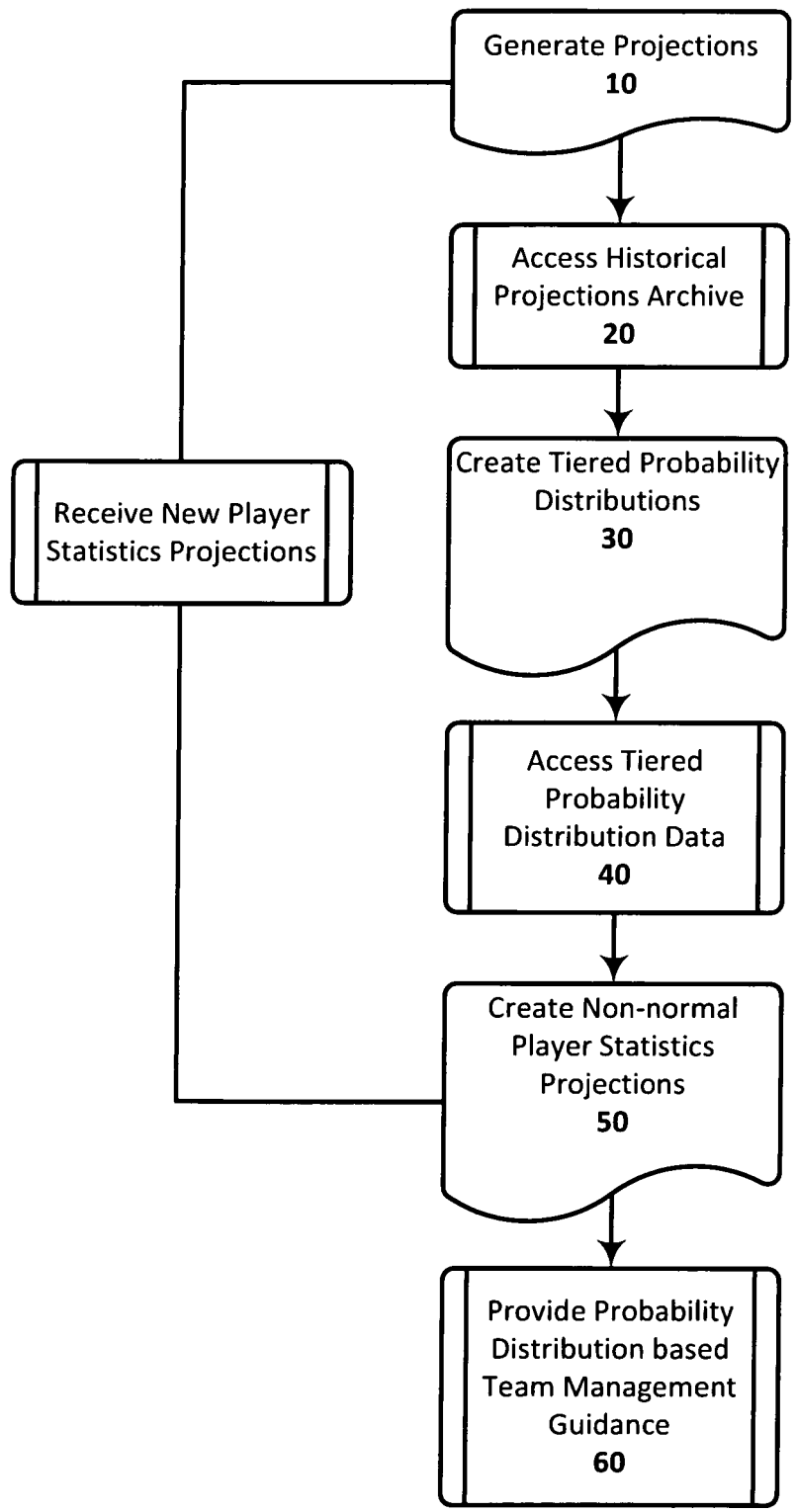
FIG. 2 is a flow diagram illustrating the process for generating and using tiered, non-normal player fantasy point projection distributions, in accordance with one embodiment of the present invention.
Figure 3:
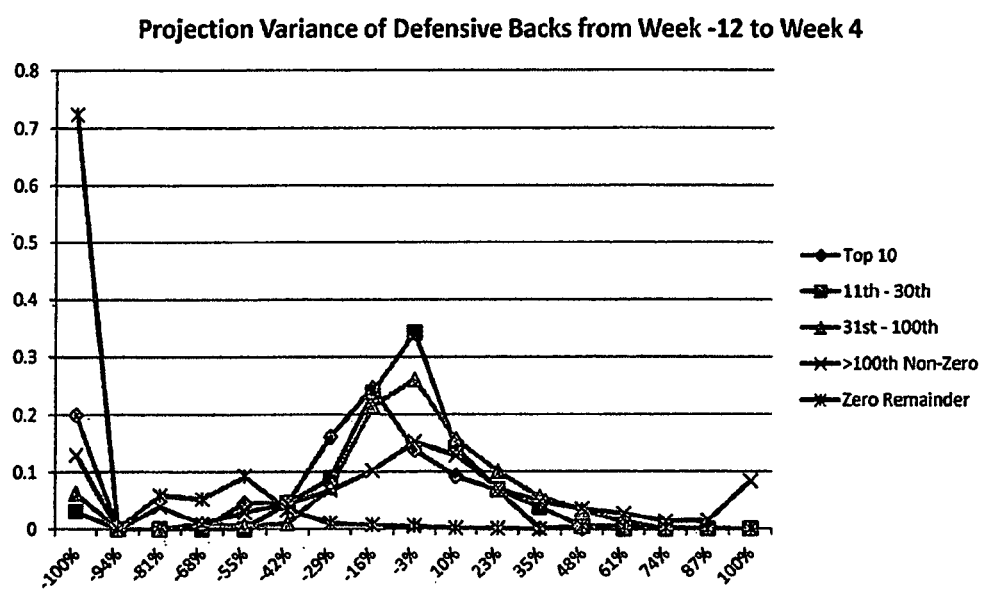
FIG. 3 is a graphical representation of tiered, non-normal probability distributions showing how defensive back fantasy point projections varied from 12 weeks before the NFL season to week 4 into the NFL season, in accordance with one embodiment of the present invention.

Attachment 2 (refer to attached CD-ROM) is a Microsoft Excel Worksheet that demonstrates an embodiment of the present invention for generating the non-normal variance and accuracy distributions shown in FIG. 2 and FIG. 3.

FIGS. 5A-5F are snapshots from Attachment 1 that demonstrate generating and using tiered, non-normal player fantasy point projection distributions, in accordance with one embodiment of the present invention.

FIG. 6 is a snapshot from Attachment 2 wherein each position is listed with the corresponding values for the average Tier 3 player for that position, in accordance with one embodiment of the present invention.

FIGS. 7A-7E are snapshots from Attachment 2 that demonstrate generating and using tiered, non-normal player fantasy point projection distributions, in accordance with one embodiment of the present invention.

FIGS. 8A-8H are snapshots from Attachment 2 that demonstrate generating the non-normal variance and accuracy distributions, in accordance with one embodiment of the present invention.

DETAILED DESCRIPTION OF THE INVENTION

Various aspects of the illustrative embodiments will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments.

Figure 1A:
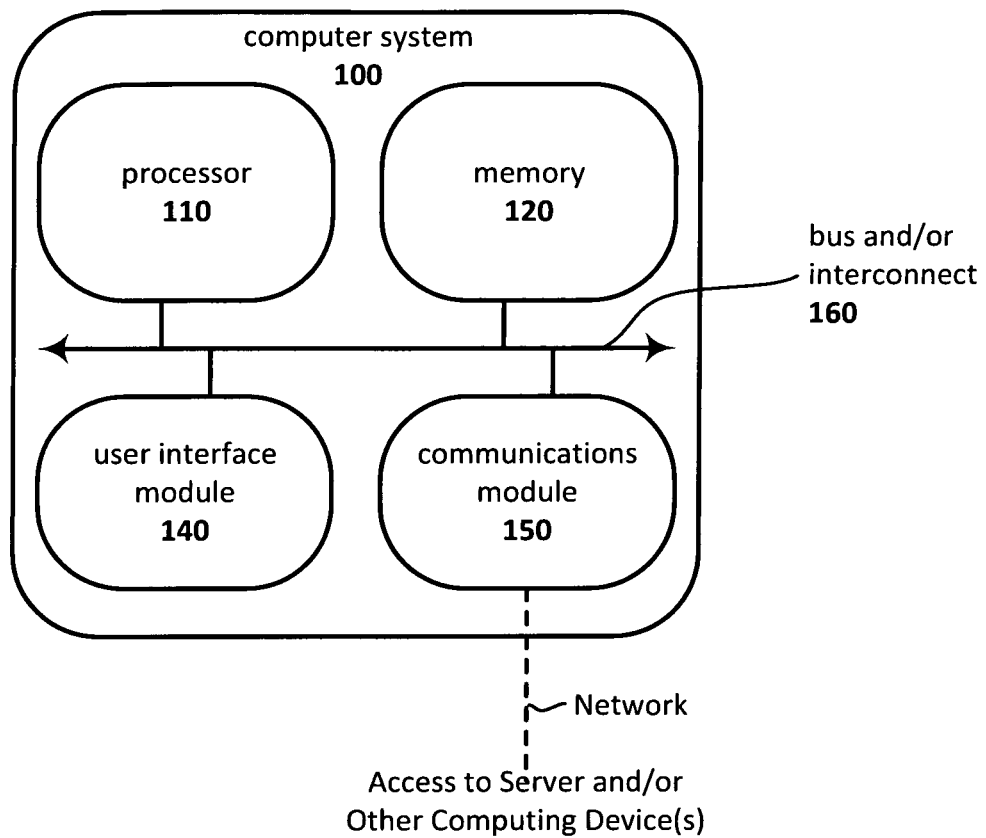
FIG. 1A is a block diagram schematically illustrating selected components of a computer system that can be used for generating and using tiered, non-normal player fantasy point projection distributions, in accordance with one embodiment of the present invention.

Various operations will be described as multiple discrete operations, in turn, in a manner that is most helpful in understanding the present invention. However, the order of description should not be construed as to imply that these operations are necessarily order dependent. In particular, these operations do not need to be performed in the order of presentation.
System Architecture FIG. 1A schematically illustrates selected components of a computer system 100 that can be used to generate and use tiered, non-normal player fantasy point projection distributions, in accordance with one embodiment of the present invention. The computer system 100 may comprise, for example, one or more devices selected from a desktop or laptop computer, a workstation, a tablet, a smartphone, a set-top box or any other such computing device. A combination of different devices may be used in certain embodiments. The computer system 100 of this example embodiment includes, among other things, a processor 110, a memory 120, a user interface module 140 and a communications module 150. As can be further seen, a bus and/or interconnect 160 is also provided to allow for intra-device/module communications. Other componentry and functionality not reflected in the schematic block diagram of FIG. 1A will be apparent in light of this disclosure, and it will be appreciated that the claimed invention is not intended to be limited to any particular hardware configuration.

The processor 110 can be any suitable processor, and may include one or more coprocessors or controllers to assist in control of the computer system 100. The processor 110 may further include on-board cache to reduce the need for accessing external memory, for example, when executing a given application or carrying out a given process. The memory 120 can be implemented using any suitable type(s) and size(s) of digital storage, such as one or more of a disk drive, a universal serial bus (USB) drive, flash memory and/or random access memory, or any other suitable non-volatile and/or volatile memory technologies. The memory 120 can be used, for example, for processor 110 workspace and/or executable file storage as well as for storing content and user files.

Figure 1B:
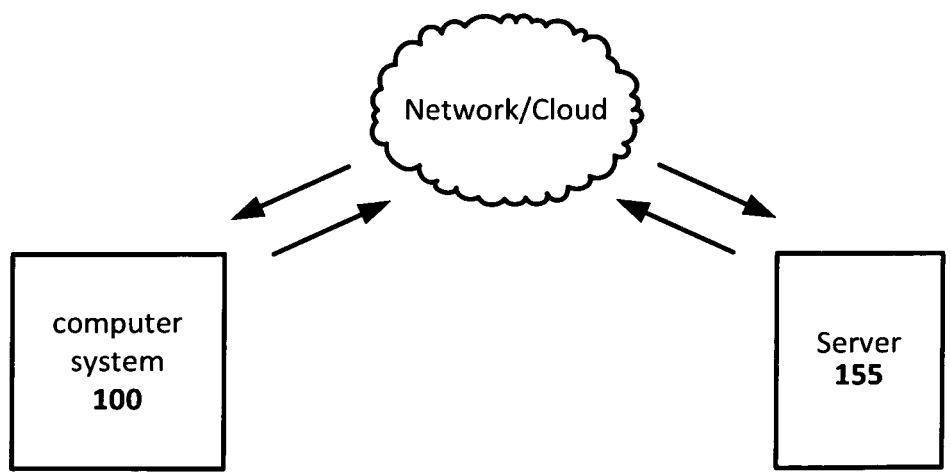
FIG. 1B is a block diagram of a network computing system that can be used for generating and using tiered, non-normal player fantasy point projection distributions, in accordance with one embodiment of the present invention.

In other embodiments, the computer system 100 may be implemented in a client-server arrangement such as the example embodiment shown in FIG. 1B wherein the client computing system 100 uses an applet (for example, a JavaScript applet that is executable within a browser application of the computing system 100) or other downloadable module that can be provisioned in real-time in response to a request from the client computing system 100 for access to a given server 155 having resources that are of interest to the user of the client computing system 100 (for example, a cloud-based repository of data and/or other content to be manipulated by the user). The server 155, if applicable, can be implemented as a web-based application server or with any other suitable server technology, and may be local to the network or remotely coupled to the network by one or more other networks and/or communication channels.

The communications module 150 can be any suitable network chip or chip set which allows for wired and/or wireless connection to a network so that the computer system 100 can communicate with other local and/or remote computing systems and/or servers, such as shown in FIG. 1B. The network may be a local area network (for example, a home-based or office network) or a wide area network (for example, the Internet) or a combination of such networks, whether private or public or both. In some cases, access to computing resources on a given network or so-called cloud-based service may require credentials such as usernames and passwords, or any other suitable security mechanisms. Other embodiments of computer system 100 may not be coupled to any network and may just operate as a stand-alone computing system, if so desired.

The user interface module 140 is configured to provide information to, and to receive information and commands from, a user of the computer system 100; it can be implemented with or otherwise used in conjunction with a variety of suitable input/output devices such as a display, a touchscreen, a speaker, a keyboard, a stylus, a touchpad, a mouse and/or a microphone. The user interface module 140 may be installed local to the computer system 100, as shown in the example embodiment of FIG. 1A. Alternatively, the computer system 100 may be implemented in a client-server arrangement such as the example embodiments shown in FIG. 1B wherein at least some portions of the user interface module 140 may be provided to client computing system 100 using an applet (for example, a JavaScript applet that is executable within a browser application of the computing system 100) or other downloadable module that can be provisioned in real-time in response to a request from the client computing system 100 for access to a given server 155 having resources that are of interest to the user of the client computing system 100 (for example, a cloud-based repository of data and/or other content to be edited by the user). As previously explained, the server 155 may be local to the network or remotely coupled to the network by one or more other networks and/or communication channels. In any such stand-alone or networked computing scenarios, the user interface module 140 may be implemented with any suitable technologies that allow a user to interact with the computing system, so that functionality of computing resources can be used as desired by that user.

The various embodiments disclosed herein can be implemented in various forms of hardware, software, firmware and/or special purpose processors. For example, in one embodiment a non-transient computer readable medium has instructions encoded thereon that, when executed by one or more processors can generate and use tiered, non-normal player fantasy point projection distributions, in accordance with one embodiment of the present invention. Such a computer readable medium can be provided in the form of a computer software application or computer program product that is tangibly embodied on one or more memory devices, and that can be executed by a computer having any suitable architecture. In certain embodiments the computer program product is specifically designed for the manipulation of projection distributions, although in other embodiments the functionalities disclosed herein can be incorporated into other software applications. The computer program product may include a number of different modules, sub-modules or other components of distinct functionality that can provide information to, or receive information from, other components. These modules can be used, for example, to communicate with input and output devices such as pointing devices, display screens and/or other user interface devices.

Methodology

The system and method of the present invention provides improved modeling of player projections using non-normal distributions, specifically comprising representations of upsides and downsides compared with projected performance for various tiers of players. The system and method of the present invention enables a probability distribution-based team management guidance system to generate more accurate recommendations for all player selection decisions, such as draft picks or starting lineup selections compared with a similar system that uses normal distributions.

Applicants' previous work focused on building an optimum system for providing team management focused on finding a way to make all decisions based on the probability of winning. The operative assumption was that the projections from the projection provider reasonably accounted for all factors that influence player performance equally for all players. It is now recognized, due in part to performance of Applicants' prior system for fantasy team management guidance that player projections do not account evenly for all factors, and in fact, the prior projection methods introduce biases that influence the mean and the accuracy for different player performance tiers. Prior to gaining experience by using the previous system, there would be no way to foresee the biases of the projection provider's method, much less compensate for them.

Applicants' previous work made many advances in the state of the art of a system and method for team management guidance. The use of probability distributions to calculate the probability to win from the first draft pick in the season through analyzing trades was a huge undertaking. It is now appreciated that the performance of the system and method of the present invention depends on the source of the initial fantasy point projections. As is now appreciated, the fantasy point projections are not equally balanced projections. Therefore, the use of a normal distribution does not fully describe the system. Each projection provider (i.e. of the historical data) introduces different biases and these biases in projections need to be removed in order to create an accurate team management tool. It is also appreciated that randomness in the system isn't true randomness. For example, a quarterback can't throw 1.3 touchdowns in a game. Instead, as in this example, there are finite possibilities (e.g. the quarterback could throw one or two touchdowns, but not 1.3).

It is now recognized that there are second order effects that must be accommodated and compensated for in order to optimize the performance of the method and system of the present invention. It is appreciated that injury plays a major role in player performance and has to be accounted for beyond the basic normal distribution. Additionally, there are many other factors that create biases in sports projections that cause player performance to vary in ways differently than described by a normal distribution. These can include a player's position on the team's depth chart, how far along a player is in their training as a professional or with a specific team, and the like.

FIG. 2 shows a flow diagram illustrating the method steps for generating and using tiered, non-normal player fantasy point projection distributions, in accordance with one embodiment of the present invention. In one embodiment, the system and method generates player projections 10. In one embodiment, the system and method provides team management player selection guidance using probability distributions. In one embodiment of the present invention, the NFL player projections (i.e. historical) were provided by AccuScore. Over the course of the 2011 NFL season, the AccuScore projections were archived every week, creating a historical projections archive 20. AccuScore, as with many other providers of player projections, projects player statistics, and also projects player fantasy points using a common set of fantasy point rules. In this embodiment of the present invention, only AccuScore's fantasy point projections were used. The archived fantasy point projection data was used as input, and the tiered probability distribution data was calculated 30 and written out to a file 40.

It is contemplated that a more complex system that operates on each statistic and then convolves the resulting distributions together based on scoring rules is possible. However, the state-of-the-art for computing has not yet provided the computing power needed to support this application as a broadly available and competitively-priced consumer product.

Still referring to FIG. 2, in Applicants' previous work, the system and method utilized projection variance (i.e. how much the projections change from week to week) separately from projection accuracy (i.e. how accurately the final projections match actual results). There, projection variance was modeled as a normal distribution with a standard deviation denoted as STDpp (standard deviation of projection-to-projection) and projection accuracy was modeled as a normal distribution with a standard deviation as STDpa (standard deviation of projection-to-actual). In contrast, in one embodiment of the method and system of the present invention, tiered probability distribution variance and accuracy data is used to build non-normal fantasy point distributions 50. The system and method of the present invention enables a probability distribution-based team management guidance system 60 to generate more accurate recommendations for all player selection decisions, such as draft picks and/or starting lineup selection compared with a similar system that uses normal distributions.

As discussed above, tiered probability data generated from archived data is only valid for creating non-normal fantasy point projections when the same method is used to generate the new projections as was used for creating the archived projections. In one embodiment of the present invention, if a new method for generating projections is introduced, a new archive can be built retroactively by running the projection system with inputs as if it were the previous year.

FIG. 3 is a graphical representation of tiered, non-normal probability distributions showing how defensive backs' fantasy point projections varied from 12 weeks before the 2011 NFL season (FW−12) to week four into the NFL season (TW4), in accordance with one embodiment of the present invention. The projections of top-tier defensive backs dropped significantly compared with fourth-tier players. In one embodiment of the method and system of the present invention, fifth-tier players are defined as players that are projected to have zero fantasy points. Since it is impossible to calculate a ratio of change when the base projection is zero, the average fantasy points of third-tier players was used as the base projection. See, for example, FIG. 6. Thus, in this embodiment, the probability distribution of the fifth-tier players represents how the projections of players that are projected to score zero fantasy points twelve weeks before the season compare to the projections of third-tier players four weeks into the season.

Figure 4:
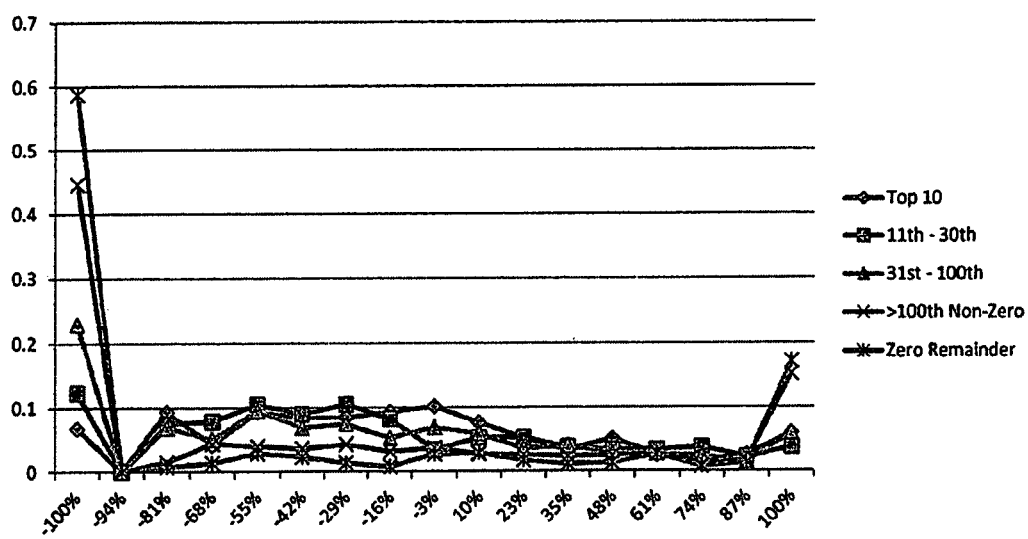
FIG. 4 is a graphical representation of tiered, non-normal probability distributions showing how accurately the final fantasy point projections for the defensive backs matched the actual fantasy point scores, where player tiers are based on projections from 12 weeks before the NFL season, in accordance with one embodiment of the present invention.

FIG. 4 is a graphical representation of tiered, non-normal probability distributions showing how accurately the final fantasy point projections for the defensive backs matched the actual fantasy point scores, where player tiers are based on projections from 12 weeks before the 2011 NFL season (FW–12), in accordance with one embodiment of the present invention.

Attachment 1 (refer to attached CD-ROM) is a Microsoft Excel Worksheet that demonstrates an embodiment of the present invention for tiered projection variance and accuracy distributions for all player positions from all weeks to all weeks based on analysis of 2011 NFL AccuScore data using the system and method described herein. In one embodiment of the present invention, calculations are run from FW–12 (twelve weeks before the start of the NFL season) to TW17 (until the week 17 of the regular NFL season).

FIGS. 5A-5F are snapshots from Attachment 1 that demonstrate generating and using tiered, non-normal player fantasy point projection distributions, in accordance with one embodiment of the present invention. For simplicity, FIGS. 5A-5F show only the data for FW–12 (i.e. 12 weeks before the start of the NFL season) to TW 1 (i.e. one week into the NFL season). In FIGS. 5A, 5C and 5E Column A shows which player position is being evaluated, where QB=quarterback, RB=running back, WR=receiver, TE=tight end, K=kicker, P=punter, DL=defensive lineman, LB=linebacker, DB=defensive back, and DEF-ST=defense and special teams. Positions that begin with TM are team positions and are generated by summing all players of the same team for a single position. For example, TMRB is the sum of all projected statistics for all running backs on a single NFL team.

In FIGS. 5A, 5C, and 5E, Column B and C are the player tiers that the distribution represents. Tier 1 is the top 10 players based on the week –12 projections, Tier 2 is the 11th through 30th player for individual player positions and 11th through 20th for team positions (See, for example, FIG. 5C). Tier 3 is the 31st through 100th player for individual player positions and 21st through 32nd for team positions (See, for example, FIG. 5C). Tier 4 is the 101st through the last player with non-zero projections for individual player positions. Tier 5 is all individual players with a projection of zero.

Still referring to Attachment 1 (refer to attached CD-ROM), for variance distributions, column D in FIGS. 5A, 5C, and 5E is the probability that the to-week projection is zero. Still referring to FIGS. 5A, 5C, and 5E, Columns E through M are the probability that to-week projection changed by a range of percentage represented from the previous bin to the mid-point of the next bin. Referring to FIGS. 5B, 5D, and 5F, Columns N through T are the probability that to-week projection changed by a range of percentage represented from the previous bin to the mid-point of the next bin, except that Column T extends to infinity. For accuracy distributions, columns D through T represent how the actual result differs from the last projection.

It is recognized that the prior art uses a model that assumes all players have equal upside and downside relative to their projected performance regardless of whether they are projected to be a top-tier player or a lower-tier player. In reality, players that are projected to perform at the very top of their respective sports league (top-tier players) generally have a smaller probability of significantly improving compared with the probability of a degraded performance over the course of a sports season.

It is also recognized that as the season progresses, top-tier players may end up playing with persistent injuries or other players on their team may be injured which can reduce a top-tier player's effectiveness. Fantasy sports end-users typically keep a handful of lower-tier players on their team rosters because these players have upside. For example, a backup running back might be projected to get ten percent (10%) of his team's rushing carries. But, if the starting running back gets injured the backup player could be projected to carry the ball eighty percent (80%) of the time.

In one embodiment of the present invention, in addition to dividing data by projected player performance tiers, data can be divided by player experience. For example, in certain embodiments, a rookie player might have more upside relative to projected statistics than a player that has been in the league twelve years. The non-normal distributions of the present invention have other uses toward player selection decisions besides the relative value of top-tier players to lower-tier players. For example, in certain embodiments, when providing guidance for setting a starting lineup, if a team's mean fantasy point projection is lower than the opposing team's mean fantasy point projection; there could be a statistical advantage to selecting players even though they have a lower mean projected performance, since they may have a higher upside potential. For example, in one embodiment of the preset invention, in a flex-position league, it might be statistically advantageous to start a wide receiver with a roughly equal probability of anywhere from one to ten receptions versus a starting running back with a much narrower range of projected performance and a roughly equal probability of anywhere from twenty to twenty-five carries.

As will be appreciated, the examples herein refer to fantasy football predictions, but it is understood that this methodology could be applied equally well to other sports, both fantasy and otherwise.

Attachment 2 (refer to attached CD-ROM) is a Microsoft Excel Worksheet that demonstrates an exemplary method for generating the non-normal variance and accuracy distributions shown in FIG. 3 and FIG. 4. Still referring to Attachment 2 (refer to attached CD-ROM), Rows 142 through 161 show the average Tier 3 projections for each position, as shown in FIG. 6. In certain embodiments, the average Tier 3 projections are used as a reference for calculating the change for Tier 5 players where the Tier 5 players have a base projection of zero.

Still referring to Attachment 2 (refer to attached CD-ROM), FIGS. 7A-7F are snapshots of an archive of fantasy point data, in accordance with an embodiment of the present invention. In FIGS. 7A-7F, Rows 163 through 199 are shown. Rows 163 through 40339 represent the archived AccuScore fantasy point data used in one embodiment of the method and system of the present invention. In FIG. 7A, Column A shows the player position, Column B shows the calculated Tier, Column C shows what team a player is on, and Column D shows for what week a projection is made—also known as the "to-week". Week 18 is a special indicator meaning season total. For simplicity, only a portion of the data in Attachment 2 is shown, for example, only the Tier 1 defensive backs from MIA and CHI are shown in FIG. 7A.

Columns E through AI show what projections are made each "from-week" from week −12 to week 17. See, for example, FIGS. 7A-7C.

Still referring to Attachment 2 (refer to attached CD-ROM), Column AK in FIG. 7C shows the last projection made for each "to-week" for each player and Column AL shows the actual fantasy point result achieved by the player in an actual NFL game. Column AO in FIG. 7D (the second column from the left) shows the ratio of change from week −12 (FW−12) projections to week 1 (TW1) projections (i.e. the projection variance). In FIG. 7D and 7E, Columns AQ through BG show which bin the ratio falls in. Columns AN through AY are shown in FIG. 7D, and Columns AZ through BL are shown in FIG. 7E. When the −12 week projection is zero, the data is not included. Despite that, data sometimes shows up in the Excel worksheet in columns AQ through BG. Columns BJ through CB are similar to Columns AO through BG, except that the ratio shown in column BJ is for the actual result versus the last projection (i.e. the projection accuracy). Column BJ is the third column from the right in FIG. 7E. To create final probability distributions, the total samples in each bin for each Tier are summed up and then divided by the total samples in all bins for the same Tier.

In FIGS. 8A, 8C, 8E, and 8G, Column A shows which player position is being evaluated, where QB=quarterback, RB=running back, WR=receiver, TE=tight end, K=kicker, P=punter, DL=defensive lineman, LB=linebacker, DB=defensive back, and DEF-ST=defense and special teams. Positions that begin with TM are team positions and are generated by summing all players of the same team for a single position. For example, TMRB is the sum of all projected statistics for all running backs on a single NFL team.

In FIGS. 8A, 8C, 8E, and 8G, Column B is the player tier that the distribution represents. Tier 1 is the top 10 players based on the week −12 projections, Tier 2 is the 11th through 30th player for individual player positions (See, for example FIGS. 8A and 8E) and 11th through 20th for team positions (See, for example FIGS. 8C and 8G). Tier 3 is the 31st through 100th player for individual player positions (See, for example FIGS. 8A and 8E) and 21st through 32nd for team positions (See, for example FIGS. 8C and 8G). Tier 4 is the 101st through the last player with non-zero projections for individual player positions. Tier 5 is all individual players with a projection of zero.

Still referring to Attachment 2 (refer to attached CD-ROM), for variance distributions, Column C in FIGS. 8A, 8C, 8E, and 8G, is the probability that the to-week projection is zero. Columns D through M in FIGS. 8A, 8C, 8E, and 8G are the probability that the to-week projection changed by a range of percentage represented from the previous bin to the mid-point of the next bin. In FIGS. 8B, 8D, 8F and 8H, Columns N through T are shown. Columns N through S are the probability that the to-week projection changed by a range of percentage represented from the previous bin to the mid-point of the next bin, except that Column S extends to infinity. For accuracy distributions, Columns C through S represent how the actual result differs from the last projection.

As noted above, FIGS. 8A-8H are snapshots from Attachment 2 that demonstrate generating the non-normal variance and accuracy distributions, in accordance with one embodiment of the present invention. In FIGS. 8A and 8B, Rows 1 through 34 are shown. In FIGS. 8C and 8D, Rows 35 through 68 are shown. In FIGS. 8E and 8F, Rows 69 through 102 are shown. In FIGS. 8G and 8H, Rows 103 through 136 are shown. Rows 1 through 69 show the variance of projections from week −12 to week 1 and rows 72 through 140 show the accuracy of final projections based on player tiers determined in week FW−12.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention.

What is claimed:

1. A computer-implemented method for using historical player projection data to build non-normal probability distributions for various tiers of player performance, comprising:
providing an archive of player fantasy point projections, wherein the archive comprises fantasy point projection data;
calculating tiered probability distributions of projection variances using the fantasy point projection data;
calculating tiered probability distributions of projection accuracy using the fantasy point projection data; and
creating non-normal fantasy point probability distributions from future player statistics projections thereby providing users with fantasy sport team management guidance.

2. The computer-implemented method of claim 1, wherein the archive comprises AccuScore NFL player fantasy point projections.

3. The computer-implemented method of claim 1, further comprising providing new player statistics projections.

4. The computer-implemented method of claim 1, wherein calculating tiered probability distributions of the projection accuracy is based on the tiers from week −12.

5. The computer-implemented method of claim 1, wherein calculating tiered probability distributions of the projection variances uses the average of Tier 3 players to approximate the variance for Tier 5 players.

6. The computer-implemented method of claim 1, wherein the fantasy sport team management guidance comprises starting lineup recommendations.

7. The computer system for using historical player projection data to build non-normal probability distributions for various tiers of player performance, comprising:
providing an archive of player fantasy point projections, wherein the archive comprises fantasy point projection data;
calculating tiered probability distributions of projection variances using the fantasy point projection data;
calculating tiered probability distributions of projection accuracy using the fantasy point projection data; and
creating non-normal fantasy point probability distributions from future player statistics projections thereby providing users with fantasy sport team management guidance.

8. The computer system of claim 7, wherein the archive comprises AccuScore NFL player fantasy point projections.

9. The computer system of claim 7, further comprising providing new player statistics projections.

10. The computer system of claim 7, wherein calculating tiered probability distributions of the projection accuracy is based on the tiers from week −12.

11. The computer system of claim 7, wherein calculating tiered probability distributions of the projection variances uses the average of Tier 3 players to approximate the variance for Tier 5 players.

12. The computer system of claim 7, wherein the fantasy sport team management guidance comprises starting lineup recommendations.

13. A non-transitory computer program product comprising program instructions encoded on one or more computer readable mediums that when executed by one or more processors cause a process for using player projection data to build non-normal probability distributions to be carried out, the process comprising:
- providing an archive of player fantasy point projections, wherein the archive comprises fantasy point projection data;
- calculating tiered probability distributions of projection variances using the fantasy point projection data;
- calculating tiered probability distributions of projection accuracy using the fantasy point projection data; and
- creating non-normal fantasy point probability distributions from future player statistics projections thereby providing users with fantasy sport team management guidance.

14. The non-transitory computer program product of claim 13, wherein the archive comprises AccuScore NFL player fantasy point projections.

15. The non-transitory computer program product of claim 13, further comprising providing new player statistics projections.

16. The non-transitory computer program product of claim 13, wherein calculating tiered probability distributions of the projection accuracy is based on the tiers from week −12.

17. The non-transitory computer program product of claim 13, wherein calculating tiered probability distributions of the projection variances uses the average of Tier 3 players to approximate the variance for Tier 5 players.

18. The non-transitory computer program product of claim 13, wherein the fantasy sport team management guidance comprises starting lineup recommendations.

* * * * *